US011735994B2

(12) United States Patent
Matsumoto et al.

(10) Patent No.: US 11,735,994 B2
(45) Date of Patent: Aug. 22, 2023

(54) INTEGRATED CIRCUIT AND POWER SUPPLY CIRCUIT

(71) Applicant: FUJI ELECTRIC CO., LTD., Kawasaki (JP)

(72) Inventors: Shinji Matsumoto, Matsumoto (JP); Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 130 days.

(21) Appl. No.: 17/484,508

(22) Filed: Sep. 24, 2021

(65) Prior Publication Data

US 2022/0166303 A1    May 26, 2022

(30) Foreign Application Priority Data

Nov. 26, 2020   (JP) ................................. 2020-196267
Mar. 23, 2021   (JP) ................................. 2021-048768

(51) Int. Cl.
  *H02M 3/335*      (2006.01)
  *H02M 1/00*       (2006.01)

(52) U.S. Cl.
  CPC ..... *H02M 1/0003* (2021.05); *H02M 3/33523* (2013.01)

(58) Field of Classification Search
  None
  See application file for complete search history.

(56) References Cited

U.S. PATENT DOCUMENTS

| 6,944,034 | B1* | 9/2005 | Shteynberg | ......... | H02M 1/4258 |
| | | | | | 363/21.13 |
| 6,956,750 | B1* | 10/2005 | Eason | ............... | H02M 3/33523 |
| | | | | | 363/21.01 |
| 8,199,535 | B2* | 6/2012 | Shimada | ........... | H02M 3/33507 |
| | | | | | 363/21.16 |
| 9,602,010 | B2* | 3/2017 | Arima | ............... | H02M 3/33507 |
| 10,020,745 | B2* | 7/2018 | Lin | .................... | H02M 3/33523 |

FOREIGN PATENT DOCUMENTS

JP   2017-127109 A   7/2017

\* cited by examiner

*Primary Examiner* — Jeffrey A Gblende
(74) *Attorney, Agent, or Firm* — Rabin & Berdo, P.C.

(57) ABSTRACT

An integrated circuit for a power supply circuit that includes a transformer and a transistor. The integrated circuit includes a first terminal receiving a voltage corresponding to a coil voltage across an auxiliary coil of the transformer when the transistor is off, a second terminal receiving a feedback voltage corresponding to an output voltage of the power supply circuit, a third terminal receiving a voltage that corresponds to a current flowing through the transistor and the coil voltage respectively when the transistor is on and off, a detection circuit configured to detect whether the voltage at the third terminal when the transistor is off is lower than a reference voltage, and a control circuit configured to control switching of the transistor based on the feedback voltage, the voltage at the third terminal when the transistor is on, and a detection result of the detection circuit.

12 Claims, 17 Drawing Sheets

FIG.6

| Vfba | Vfbb | Vfbc | Vfbd |
|---|---|---|---|
| V1=VREF4 | V1=VREF5 | V3=VREF5 | V3=VREF6 |

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application numbers 2020-196267 and 2021-048768, filed on Nov. 26, 2020 and Mar. 23, 2021, respectively, the entire disclosure of which is hereby incorporated by reference herein.

BACKGROUND

Technical Field

The present disclosure relates to an integrated circuit and a power supply circuit.

Description of the Related Art

In some AC-DC converters, voltages across a secondary coil and an auxiliary coil are generated by switching a transistor that controls an inductor current flowing through a primary coil of a transformer. In such an AC-DC converter, generally, an integrated circuit that drives the transistor operates using the voltage from the auxiliary coil as a power supply voltage.

Such an integrated circuit may include a detection circuit that detects the power of a load based on the level of the power supply voltage at a power supply terminal applied from the auxiliary coil, and that changes the mode of driving the transistor (for example, Japanese Patent Application Publication No. 2017-127109).

In general, the power supply voltage at the power supply terminal of the integrated circuit is generated based on the voltage from the auxiliary coil, and thus noise and the like may be superimposed thereon, and this may significantly change the power supply voltage. In addition, with respect to the power supply voltage, the number of turns of the auxiliary coil and the like are set in consideration of other circuits coupled to the power supply terminal (for example, a circuit for detecting a drop in the power supply voltage), and thus it has been difficult to appropriately operate the above-described detection circuit based on the voltage at the power supply terminal.

The present disclosure is directed to provision of an integrated circuit capable of appropriately detecting a voltage from an auxiliary coil.

SUMMARY

A first aspect of the present disclosure is an integrated circuit for a power supply circuit that generates an output voltage at a target level from an input voltage inputted thereto, the power supply circuit including a transformer including a primary coil, a secondary coil, and an auxiliary coil, and a transistor configured to control a current flowing through the primary coil, the integrated circuit being configured to drive the transistor, the integrated circuit comprising: a first terminal configured to receive a voltage corresponding to a coil voltage across the auxiliary coil when the transistor is off; a second terminal configured to receive a feedback voltage corresponding to the output voltage; a third terminal configured to receive a voltage, which corresponds to a current flowing through the transistor when the transistor is on, and corresponds to the coil voltage when the transistor is off; a first detection circuit configured to detect whether the voltage at the third terminal when the transistor is off is lower than a first reference voltage; and a control circuit configured to control switching of the transistor based on the feedback voltage, the voltage at the third terminal when the transistor is on, and a result of detection of the first detection circuit.

A second aspect of the present disclosure is a power supply circuit configured to generate an output voltage at a target level from an input voltage inputted thereto, the power supply circuit comprising: a transformer including a primary coil, a secondary coil, and an auxiliary coil; a transistor configured to control a current flowing through the primary coil; an integrated circuit including first to third terminals, the integrated circuit being configured to drive the transistor; a first diode configured to rectify a coil voltage across the auxiliary coil; a first capacitor coupled to the first terminal, and configured to be charged with a current flowing through the first diode; a detection resistor coupled to the third terminal, and configured to detect a current flowing through the transistor when the transistor is on; a second diode configured to rectify the coil voltage; and a second capacitor coupled to the third terminal, and configured to be charged with a current flowing through the second diode, wherein the integrated circuit includes a first detection circuit configured to detect whether a voltage at the third terminal when the transistor is off is lower than a first reference voltage, and a control circuit configured to control switching of the transistor, based on the voltage at the third terminal when the transistor is on, a result of detection of the first detection circuit, and a feedback voltage that is received by the second terminal and that corresponds to the output voltage.

A third aspect of the present disclosure is an integrated circuit for a power supply circuit that generates an output voltage at a target level from an input voltage inputted thereto, the power supply circuit including a transformer including a primary coil, a secondary coil, and an auxiliary coil, and a transistor configured to control a current flowing through the primary coil, the integrated circuit being configured to drive the transistor, the integrated circuit comprising: a first terminal configured to receive a first voltage corresponding to a coil voltage across the auxiliary coil when the transistor is off; a second terminal configured to receive a second voltage that is a feedback voltage corresponding to the output voltage; a third terminal configured to receive a third voltage corresponding to a current flowing through the transistor when the transistor is on; a detection circuit configured to detect whether the first voltage at the first terminal when the transistor is off is lower than a reference voltage; and a control circuit configured to control switching of the transistor, based on the third voltage at the third terminal when the transistor is on, a result of detection of the detection circuit, and the feedback voltage, wherein the control circuit incudes an overcurrent detection circuit that is coupled to the third terminal, the overcurrent detection circuit being configured to determine whether the current flowing through the transistor is overcurrent, and the overcurrent detection circuit has a determination threshold for determining the overcurrent, the determination threshold being switched according to the result of detection using the reference voltage of the detection circuit.

A forth aspect of the present disclosure is a power supply circuit configured to generate an output voltage at a target level from an input voltage inputted thereto, the power supply circuit comprising: a transformer including a primary coil, a secondary coil, and an auxiliary coil; a transistor configured to control a current flowing through the primary coil; an integrated circuit including first to third terminals, the integrated circuit being configured to drive the transistor; a first diode configured to rectify a coil voltage across the auxiliary coil; a first capacitor coupled to the first terminal, and configured to be charged with a current flowing through the first diode; and a detection resistor coupled to the third terminal, and configured to detect a current flowing through the transistor when the transistor is on, wherein the integrated circuit includes a detection circuit configured to detect whether a voltage at the first terminal when the transistor is off is lower than a reference voltage, and a control circuit configured to control switching of the transistor, based on a voltage at the third terminal when the transistor is on, a result of detection of the detection circuit, and a feedback voltage that is received by the second terminal and that corresponds to the output voltage, wherein the control circuit includes an overcurrent detection circuit that is coupled to the third terminal, the overcurrent detection circuit being configured to determine whether the current flowing through the transistor is overcurrent, and the overcurrent detection circuit has a determination threshold for determining the overcurrent, the determination threshold being switched according to the result of detection using the reference voltage of the detection circuit.

BRIEF DESCRIPTION OF THE DRAWINGS

FIG. 1 is a diagram illustrating an example of a configuration of an AC-DC converter 10a.

FIG. 2 is a diagram illustrating an example of a configuration of a control IC 42a.

FIG. 3 is a diagram illustrating an example of a configuration of a control circuit 62a.

FIG. 6 is a diagram illustrating an example of a configuration of a voltage control oscillator circuit 124.

FIG. 12 is a diagram illustrating an over power protection circuit (OPP) 60b, which is a modification of an OPP 60a.

DETAILED DESCRIPTION

At least following matters will become apparent from the descriptions of the present specification and the accompanying drawings.

Embodiments

Figure 1:
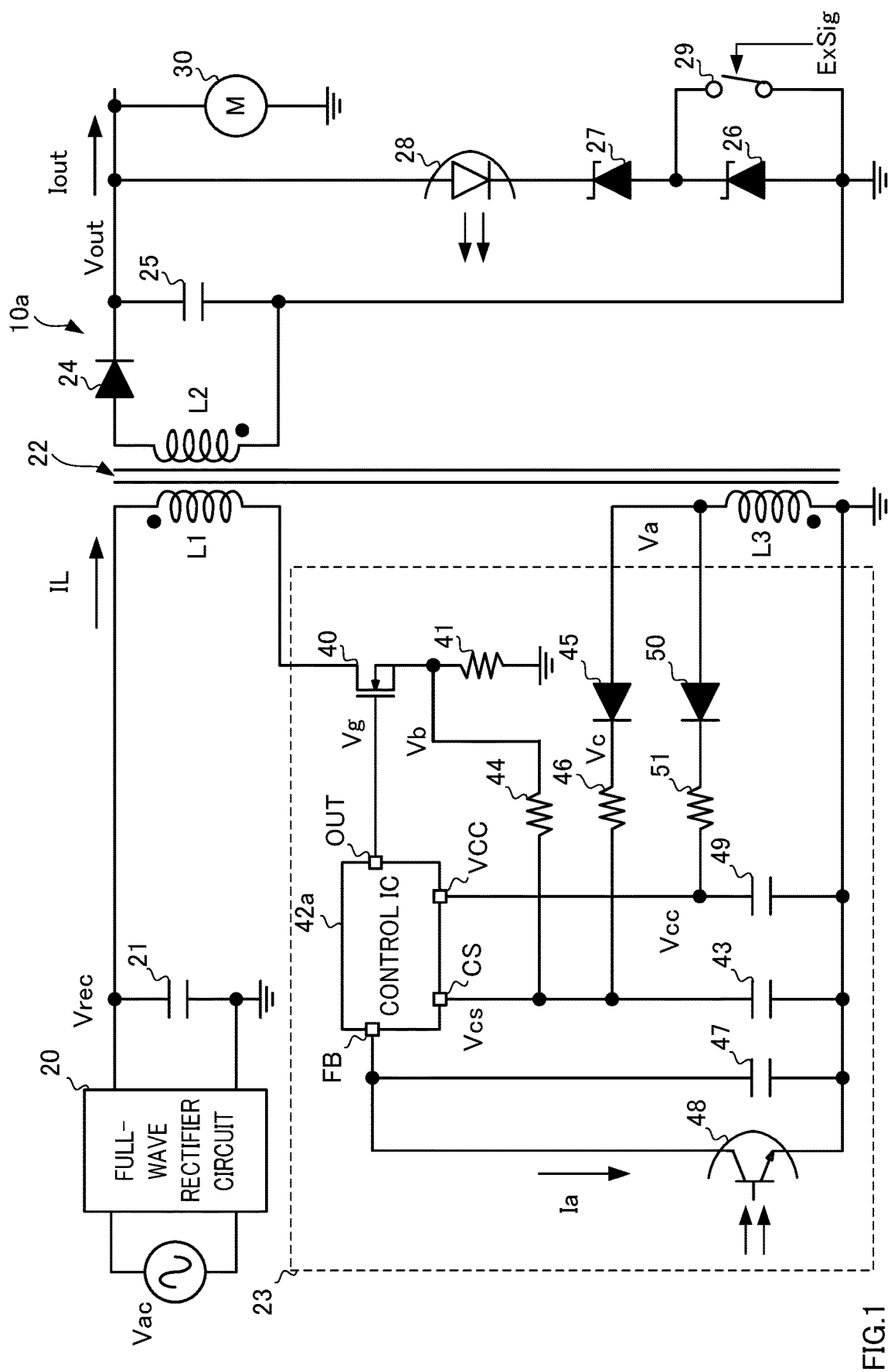

FIG. 1 is a diagram illustrating an example of a configuration of an AC-DC converter 10a, which is an embodiment of the present disclosure. The AC-DC converter 10a is a flyback power supply circuit that generates an output voltage Vout at a target level from an alternating-current voltage Vac of a commercial power supply.

<<<Overview of AC-DC Converter 10a>>>

The AC-DC converter 10a includes a full-wave rectifier circuit 20, capacitors 21 and 25, a transformer 22, a control block 23, a diode 24, Zener diodes 26 and 27, a light-emitting diode 28, and a switch 29. The AC-DC converter 10a supplies power to a motor 30.

The full-wave rectifier circuit 20 full-wave rectifies an inputted predetermined alternating-current voltage Vac and outputs the rectified voltage to a primary coil L1 of the transformer 22 and the capacitor 21 as a voltage Vrec. The capacitor 21 smooths the voltage Vrec. The alternating-current voltage Vac is a voltage having an effective value of 100 to 240 V and a frequency of 50 to 60 Hz, for example.

The transformer 22 includes the primary coil L1 and a secondary coil L2 and an auxiliary coil L3 that are magnetically connected to the primary coil L1. In this case, the secondary coil L2 and the auxiliary coil L3 are formed by winding such that the voltages generated across the secondary coil L2 and the auxiliary coil L3 have a polarity opposite to that of the voltage generated across the primary coil L1.

The control block 23 controls an inductor current IL flowing through the primary coil L1 on the primary side of the transformer 22, thereby controlling the voltage generated across the secondary coil L2 on the secondary side of the transformer 22. As a result, the output voltage Vout of the target level is generated on the secondary side of the transformer 22.

The diode 24 rectifies a current from the secondary coil L2 of the transformer 22, and supplies the rectified current to the capacitor 25. The capacitor 25 is charged with the current from the diode 24, and thus the output voltage Vout is generated across the capacitor 25.

The Zener diodes 26 and 27 and the light-emitting diode 28 are provided in series between a cathode of the diode 24 and a ground, and the Zener diodes 26 and 27 are coupled to each other in series such that a voltage corresponding to the output voltage Vout is the reverse voltage of the Zener diodes 26 and 27. The light-emitting diode 28 is provided between the cathode of the diode 24 and a cathode of the Zener diode 27.

The Zener diodes 26 and 27 are elements that output a constant voltage upon application of a reverse voltage.

The light-emitting diode 28 is an element that emits light having an intensity according to a voltage between the output voltage Vout and the cathode of the Zener diode 27.

The switch 29 is coupled in parallel with the Zener diode 26 and is turned on and off in response to an external signal ExSig from a device (not illustrated) that controls the motor 30. The switch 29 is turned on upon the motor 30 entering a standby state.

The motor 30 is a load coupled to the AC-DC converter 10a, and the output voltage Vout is applied to the motor 30. A current flowing through the motor 30 is defined as an output current Iout.

<<<Overview of Control Block 23>>>

The control block 23 is a circuit block to control the AC-DC converter 10a. The control block 23 includes a power transistor 40, resistors 41, 44, 46, and 51, a control IC 42a, capacitors 43, 47, and 49, diodes 45 and 50, and a phototransistor 48.

The power transistor 40 is an NMOS transistor to control power to be supplied to the motor 30. In an embodiment of the present disclosure, it is assumed that the power transistor 40 is a metal oxide semiconductor (MOS) transistor, however, it is not limited thereto. As long as the power transistor 40 is a transistor capable of controlling power, the power transistor 40 may be a bipolar transistor or the like, for example.

The resistor 41 is a resistor to detect the inductor current IL flowing through the primary coil L1 when the power transistor 40 is on, and the resistor 41 has one end coupled to a source electrode of the power transistor 40, and the other end grounded.

The control IC 42a is an integrated circuit that controls switching of the power transistor 40 such that the output voltage Vout is at the target level. In specific, the control IC 42a drives the power transistor 40 based on the inductor current IL and the output voltage Vout.

Although the details of the control IC 42a will be described later, the control IC 42a has terminals CS, FB, OUT, and VCC. A gate electrode of the power transistor 40 is coupled to the terminal OUT. The control IC 42a actually has other terminals as well, however, they are omitted for convenience.

The capacitor 43 is provided between the terminal CS and the ground, and receives, through the resistor 44, a voltage across the resistor 41 that is generated with the inductor current IL flowing. The capacitor 43 and the resistor 44 configure a low-pass filter, and stabilize a voltage Vcs at the terminal CS.

The diode 45 has an anode coupled to the auxiliary coil L3, and a cathode coupled to the terminal CS through the resistor 46.

The capacitor 47 is provided between the terminal FB and the ground, and stabilizes a voltage Vfb at the terminal FB. The voltage Vfb is a feedback voltage corresponding to the output voltage Vout, and is applied to the terminal FB. The control IC 42a turns on the power transistor 40 with a frequency according to the voltage Vfb, and details will be described later. Usually, upon the voltage Vcs exceeding the voltage Vfb while the power transistor 40 is on, the control IC 42a turns off the power transistor 40.

The phototransistor 48 is provided between the terminal FB and the ground, and configures a photo coupler with the light-emitting diode 28 on the secondary side of the transformer 22. When the intensity of the light emitted by the light-emitting diode 28 increases, the phototransistor 48 passes a larger sink current Ia through the terminal FB.

The capacitor 49 is provided between the terminal VCC and the ground. The diode 50 has an anode coupled to the auxiliary coil L3, and a cathode coupled to the terminal VCC through the resistor 51. A voltage Va generated across the auxiliary coil L3 is applied to the capacitor 49 through the diode 50 and the resistor 51, and a voltage across the capacitor 49 serves as a power supply voltage Vcc of the control IC 42a. When the power transistor 40 is off, a voltage corresponding to the voltage Va across the auxiliary coil L3, in other words, the voltage across the capacitor 49, is applied to the terminal VCC.

Here, the voltage Vfb changes with the output voltage Vout and determines a current value of the inductor current IL, and details will be described later. In other words, the output voltage Vout determines the current value of the inductor current IL. A change in the current value of the inductor current IL changes the voltage Va. A change in the voltage Va changes the power supply voltage Vcc.

Accordingly, when the level of the output voltage Vout changes, the power supply voltage Vcc changes as well. Thus, it is possible to detect a change in the level of the output voltage Vout by detecting a change in the power supply voltage Vcc.

The power supply voltage Vcc is determined by adjusting the turns ratio among the primary coil L1, the secondary coil L2, and the auxiliary coil L3 of the transformer. In this case, it is difficult to adjust the turns ratio for outputting the output voltage Vout of the target level in order to detect a change in the output voltage Vout, and thus a resistance value of the resistor 51 needs to be adjusted.

However, if the power supply voltage Vcc changes due to the adjustment of the resistance value of the resistor 51, a circuit block, in the later-described control IC 42a, that detects the power supply voltage Vcc to operate is also affected. Accordingly, it is difficult to detect a change in the output voltage Vout without affecting the circuit block.

Note that the alternating-current voltage Vac corresponds to an "input voltage", and the voltage Va corresponds to a "coil voltage". The capacitor 49 corresponds to a "first capacitor", and the capacitor 43 corresponds to a "second capacitor". The diode 50 corresponds to a "first diode", and the diode 45 corresponds to a "second diode". The terminal VCC corresponds to a "first terminal", the terminal FB corresponds to a "second terminal", and the terminal CS corresponds to a "third terminal". The resistor 41 corresponds to a "detection resistor".

<<<Configuration of Control IC 42a>>>

Figure 2:
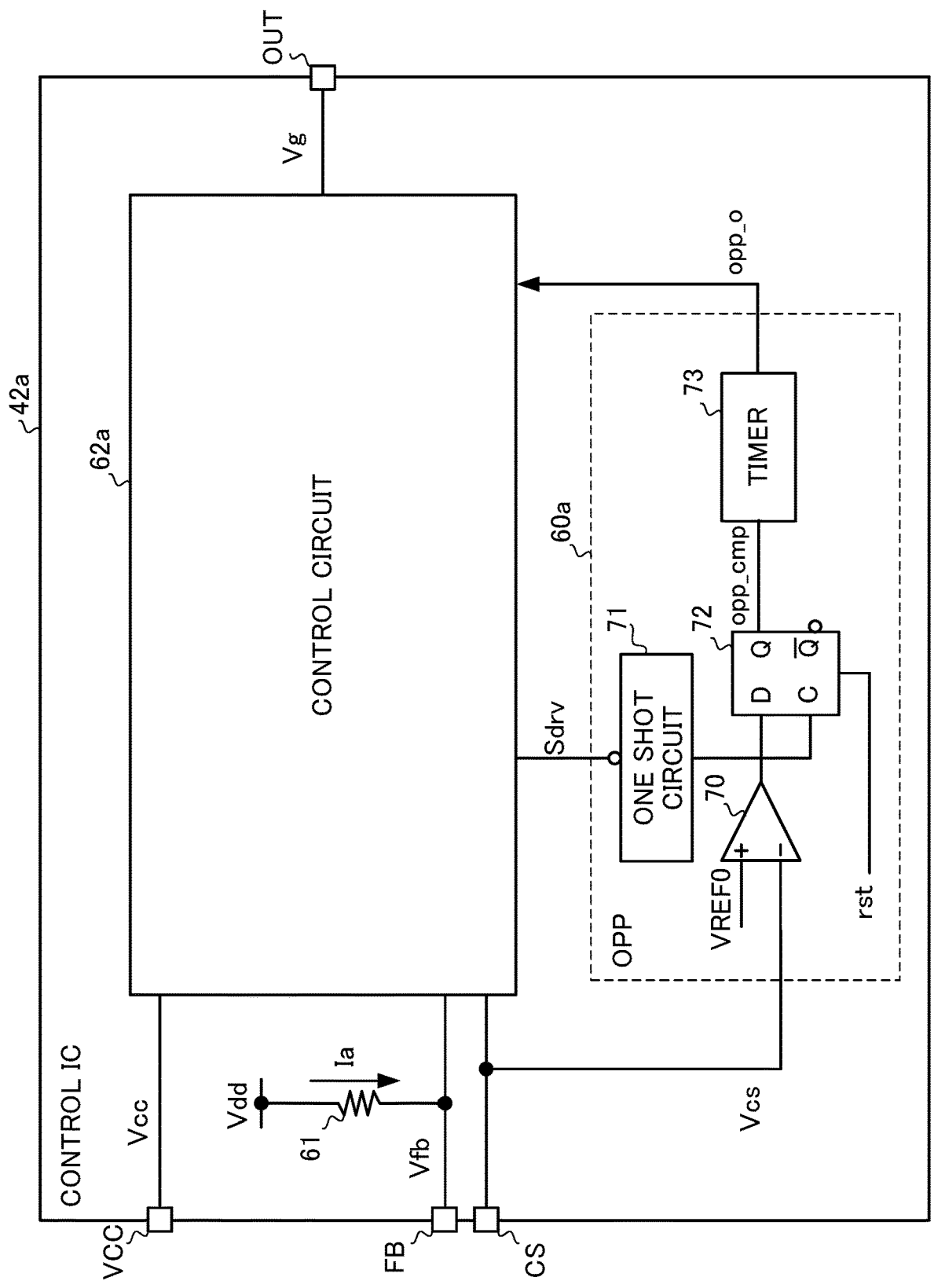

FIG. 2 is a diagram illustrating an example of a configuration of the control IC 42a. The control IC 42a includes an over power protection circuit (OPP) 60a, a resistor 61, and a control circuit 62a.

The OPP 60a detects that the target level of the output voltage Vout has changed, using the external signal ExSig. In specific, the OPP 60a outputs a signal opp_o at an "H" level (hereinafter, referred to as high or high level), when the power transistor 40 is off and the voltage Vcs is lower than a reference voltage VREF0 for a predetermined period of time.

On the other hand, the OPP 60a outputs the signal opp_o at an "L" level (hereinafter, referred to as low or low level), upon the voltage Vcs exceeding the reference voltage VREF0 when the power transistor 40 is off. The OPP 60a includes a comparator 70, a one shot circuit 71, a D flip-flop 72, and a timer 73.

The comparator 70 compares the voltage Vcs to the reference voltage VREF0, and outputs a low signal when the voltage Vcs is higher than the reference voltage VREF0. On the other hand, the comparator 70 outputs a high signal when the voltage Vcs is lower than the reference voltage VREF0.

The one shot circuit 71 generates a pulse signal at the falling edge of a signal Sdrv outputted by the control circuit 62a, and details will be described later.

When an under voltage lock out circuit (UVLO) 84, which will be described later, outputs a low reset signal rst, and the one shot circuit 71 outputs the pulse signal, the D flip-flop 72 outputs the signal received from the comparator 70 as a signal opp_cmp. On the other hand, when the UVLO 84 outputs the low reset signal rst, and the one shot circuit 71 does not output the pulse signal, the D flip-flop 72 maintains the signal opp_cmp at its previous logic level. Upon the UVLO 84, which will be described later, outputting the high reset signal rst, the D flip-flop 72 is reset.

In other words, when the reset signal rst is low, the comparator 70, the one shot circuit 71, and the D flip-flop 72 output the signal opp_cmp indicating whether the voltage Vcs is higher than the reference voltage VREF0 at the falling edge of the signal Sdrv.

The timer 73 is a circuit that determines whether the high signal opp_cmp is received for a predetermined period of time, and when the high signal opp_cmp is received for a predetermined period of time, the timer 73 outputs the high signal opp_o. On the other hand, when the low signal opp_cmp is received, the timer 73 outputs the low signal opp_o.

The operation mode of the control IC 42a when the signal opp_o is low is defined as a "normal mode", and the operation mode of the control IC 42a when the signal opp_o is high is defined as an "OPP mode".

The resistor 61 is provided between the terminal FB and a node for receiving an internal voltage Vdd generated by an internal power supply (not illustrated) from the power supply voltage Vcc, and generates the voltage Vfb corresponding to the sink current Ia passed by the phototransistor 48.

The control circuit 62a controls switching of the power transistor 40 based on the voltage Vfb, the voltage Vcs when the power transistor 40 is on, and the signal opp_o.

Note that the comparator 70 corresponds to a "comparison circuit", the high signal opp_cmp corresponds to a "first signal", and the low signal opp_cmp corresponds to a "second signal". The timer 73 corresponds to an "output circuit". The OPP 60a corresponds to a "first detection circuit", and the reference voltage VREF0 corresponds to a "first reference voltage". The signal opp_o corresponds to a "result of a detection".

<<<Configuration of Control Circuit 62a>>>

Figure 3:
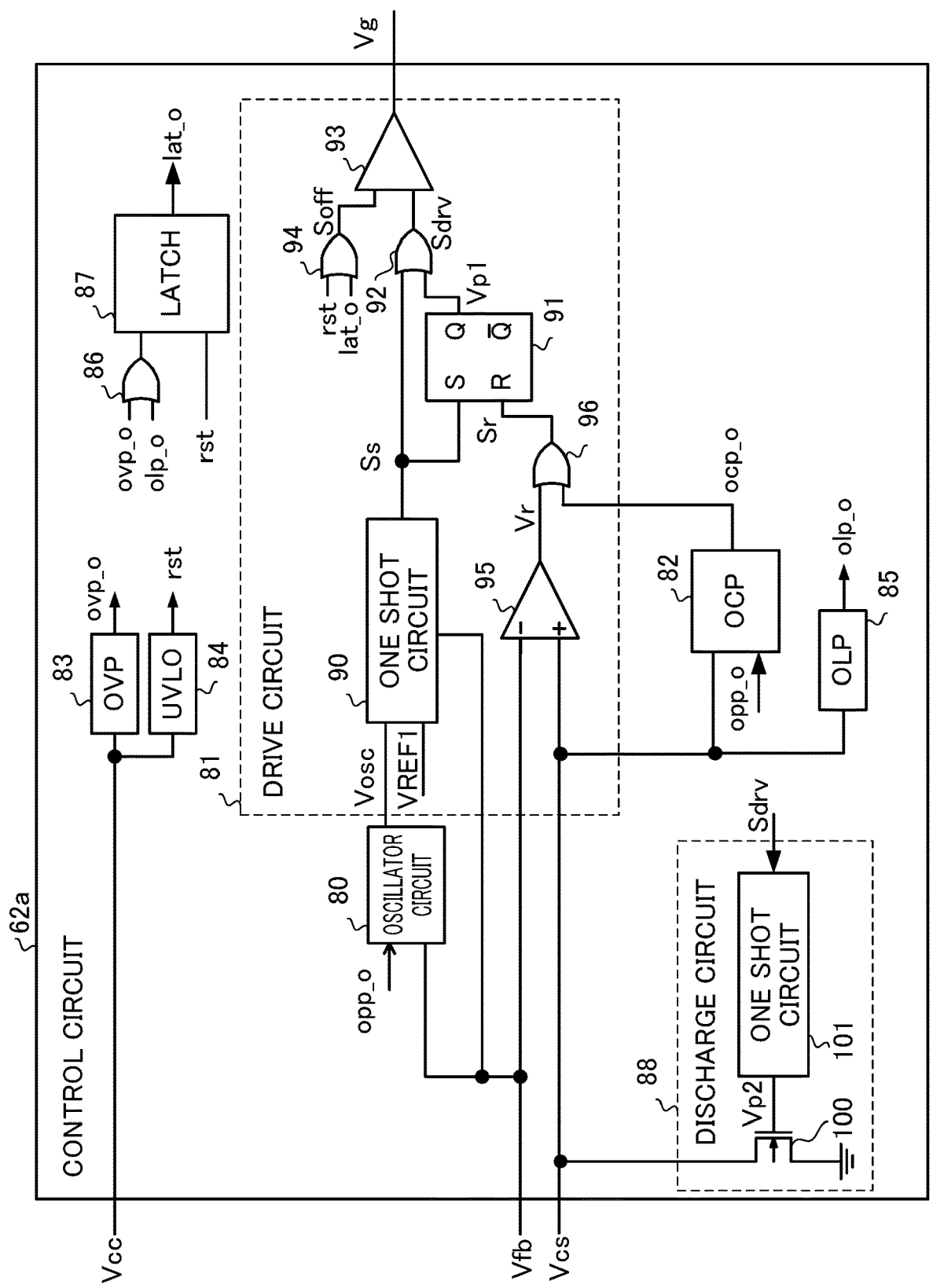

FIG. 3 is a diagram illustrating an example of a configuration of the control circuit 62a. The control circuit 62a includes an oscillator circuit 80, a drive circuit 81, an over current protection circuit (OCP) 82, an over voltage protection circuit (OVP) 83, the UVLO 84, an overload protection circuit (OLP) 85, an OR circuit 86, and a latch 87.

The oscillator circuit 80 outputs an oscillation signal Vosc with a frequency Fsw corresponding to the voltage Vfb and the signal opp_o. In specific, upon the OPP 60a outputting the high signal opp_o, the oscillator circuit 80 outputs the oscillation signal Vosc with a frequency Fsw0. On the other hand, upon the OPP 60a outputting the low signal opp_o, the oscillator circuit 80 outputs the oscillation signal Vosc with one of frequencies Fsw0 to Fsw2 according to the voltage Vfb. Details of the oscillator circuit 80 will be described later.

The drive circuit 81 turns on the power transistor 40 in response to the oscillation signal Vosc, and turns off the power transistor 40 in response to the voltage Vcs when the power transistor 40 is on and the voltage Vfb.

The drive circuit 81 includes a one shot circuit 90, an SR flip-flop 91, OR circuits 92, 94, and 96, a buffer 93, and a comparator 95.

The one shot circuit 90 outputs the pulse signal Ss at the rising edge of the oscillation signal Vosc. In specific, when the voltage Vfb is lower than a reference voltage VREF1, the one shot circuit 90 stops outputting the pulse signal Ss. On the other hand, when the voltage Vfb is higher than the reference voltage VREF1, the one shot circuit 90 outputs the pulse signal Ss with the frequency Fsw corresponding to the frequency Fsw of the oscillation signal Vosc.

When the one shot circuit 90 outputs the pulse signal Ss, the SR flip-flop 91 outputs a high signal Vp1. On the other hand, when the OR circuit 96 outputs a high signal Sr, the SR flip-flop 91 outputs the low signal Vp1, and details will be described later.

The OR circuit 92 obtains a logical sum of the pulse signal Ss and the signal Vp1 and outputs a resultant signal as the signal Sdrv. In other words, upon the pulse signal Ss or the signal Vp1 going high, the OR circuit 92 outputs the high signal Sdrv. On the other hand, upon the pulse signal Ss and the signal Vp1 going low, the OR circuit 92 outputs the low signal Sdrv.

The buffer 93 amplifies the signal Sdrv and outputs a resultant signal as a driving signal Vg. In specific, when the OR circuit 92 outputs the high signal Sdrv, and the OR circuit 94 outputs a low signal Soff, the buffer 93 outputs the driving signal Vg to turn on the power transistor 40. On the other hand, when the OR circuit 92 outputs the low signal Sdrv, and the OR circuit 94 outputs the low signal Soff, the buffer 93 outputs the driving signal Vg to turn off the power transistor 40. When the OR circuit 94 outputs the high signal Soff, the buffer 93 outputs the driving signal Vg to turn off the power transistor 40.

The OR circuit 94 is an element that obtains a logical sum of the reset signal rst from the UVLO 84, which will be described later, and a signal lat_o from the latch 87, which will be described later. In specific, when the signal rst or the signal lat_o is high, the OR circuit 94 causes the buffer 93 to output the driving signal Vg to stop switching the power transistor 40. On the other hand, when the signal rst and the signal lat_o are low, the OR circuit 94 causes the buffer 93 to output the driving signal Vg to switch the power transistor 40.

The comparator 95 is a circuit that compares the voltage Vcs when the power transistor 40 is on to the voltage Vfb, and outputs a high signal Vr when the voltage Vcs is higher than the voltage Vfb. When the voltage Vcs at a time when the power transistor 40 is on is lower than the voltage Vfb, the comparator 95 outputs the low signal Vr.

Note that the voltage Vcs may be inputted to the comparator 95 as a voltage Vcs1 through a slope compensation circuit (not illustrated). In this case, the voltage Vcs1 is compared to the voltage Vfb, and when the voltage Vcs1 exceeds the voltage Vfb, the comparator 95 outputs the high signal Vr. On the other hand, when the voltage Vcs1 does not exceed the voltage Vfb, the comparator 95 outputs the low signal Vr.

The OR circuit 96 is an element that obtains a logical sum of a signal ocp_o from the OCP 82, which will be described later, and the signal Vr, and outputs a resultant signal as the signal Sr. Usually, the OCP 82 outputs the low signal ocp_o, and thus the signal Sr is the same as the signal Vr.

Accordingly, when the voltage Vcs exceeds the voltage Vfb, and the comparator 95 outputs the high signal Vr, the SR flip-flop 91 outputs the low signal Vp1. Thus, when the voltage Vcs exceeds the voltage Vfb, the power transistor 40 is turned off.

The OCP 82 is a circuit that determines whether the inductor current IL flowing through the power transistor 40 is larger than a predetermined current indicating an overcurrent, based on the voltage Vcs and the signal opp_o. In specific, when the inductor current IL is larger than the predetermined current, the OCP 82 outputs the high signal ocp_o. On the other hand, when the inductor current IL is smaller than the predetermined current, the OCP 82 outputs the low signal ocp_o. Details of the OCP 82 will be described later.

The OVP 83 causes the buffer 93 to stop switching the power transistor 40 to thereby turn off the power transistor 40, when the power supply voltage Vcc is higher than a first predetermined voltage (e.g., 25.5 V) for a predetermined period of time. In specific, when the power supply voltage Vcc is higher than the first predetermined voltage for the predetermined period of time, the OVP 83 outputs a high signal ovp_o. On the other hand, when the power supply voltage Vcc continues to be higher than the first predetermined voltage for the predetermined period of time, the OVP 83 outputs the low signal ovp_o. Note that the OVP 83 corresponds to a "third detection circuit", and the first predetermined voltage corresponds to a "second reference voltage".

The UVLO 84 resets the control IC 42a when the power supply voltage Vcc is equal to or lower than a second predetermined voltage (e.g., 6.5 V). In specific, when the power supply voltage Vcc is equal to or lower than the second predetermined voltage, the UVLO 84 outputs the high reset signal rst to reset the control IC 42a. On the other hand, when the power supply voltage Vcc is higher than a third predetermined voltage (e.g., 13 V), the UVLO 84 outputs the low signal rst.

The OLP 85 detects the inductor current IL based on the voltage Vcs when the power transistor 40 is turned on so as to detect whether the motor 30 is in an overload condition. In specific, the OLP 85 outputs a high signal olp_o when the overload condition continues for a predetermined period of time. On the other hand, when the overload condition does not continue for the predetermined period of time, the OLP 85 outputs the low signal olp_o.

When the OLP 85 outputs the high signal olp_o, the buffer 93 stops switching the power transistor 40. Note that the value of the voltage Vcs for the OLP 85 to determine that the motor 30 is in the overload condition is lower than the value of the voltage Vcs for the OCP 82 to determine that the current flowing through the power transistor 40 is larger than the predetermined current.

The OR circuit 86 is an element that obtains a logical sum of the signal ovp_o and the signal olp_o.

The latch 87 is a circuit that outputs the high signal lat_o to cause the buffer 93 to stop switching the power transistor 40, when the UVLO 84 outputs the low signal rst and the OR circuit 86 outputs the high signal.

In the case where the UVLO 84 outputs the low signal rst, even if the OR circuit 86 outputs the low signal after outputting the high signal, the latch 87 keeps outputting the high signal lat_o without outputting the low signal lat_o. On the other hand, in the case where the UVLO 84 outputs the high signal rst, the latch 87 outputs the low signal lat_o.

A discharge circuit 88 discharges the capacitor 43 coupled to the terminal CS upon turning on of the power transistor 40, in other words, at the rising edge of the signal Sdrv. The discharge circuit 88 includes an NMOS transistor 100 and a one shot circuit 101.

The NMOS transistor 100 is turned on in response to a pulse signal Vp2 from the one shot circuit 101, the pulse signal Vp2 having a pulse width shorter than an on period Ton during which the power transistor 40 is on, and discharges the charge stored in the capacitor 43 to the ground.

Upon the OR circuit 92 outputting the high signal Sdrv, the one shot circuit 101 outputs the pulse signal Vp2 having a pulse width shorter than the on period Ton of the power transistor 40.

<<<Configuration of OCP 82>>>

Figure 4:
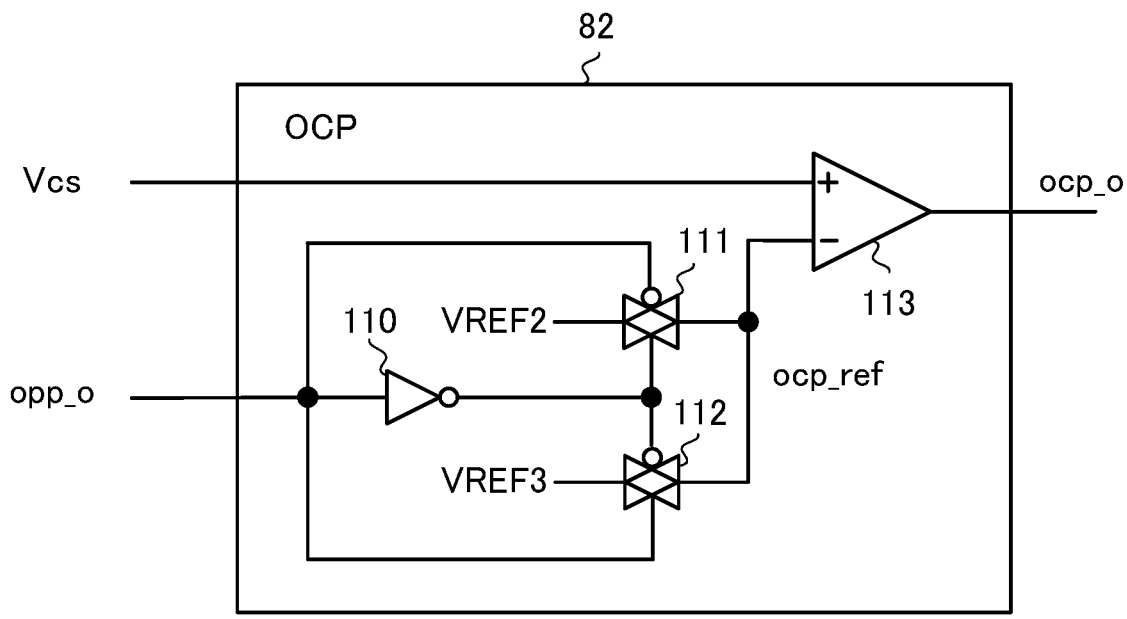
FIG. 4 is a diagram illustrating an example of a configuration of an over current protection circuit (OCP) 82.

FIG. 4 is a diagram illustrating an example of a configuration of the OCP 82. In specific, the OCP 82 compares a predetermined current (i.e., a current value determined based on a reference voltage ocp_ref) adjusted based on the signal opp_o to the inductor current IL when the power transistor 40 is on. When the voltage Vcs when the power transistor 40 is on exceeds the reference voltage ocp_ref, the OCP 82 outputs the high signal ocp_o. On the other hand, when the voltage Vcs is lower than the reference voltage ocp_ref, the OCP 82 outputs the low signal ocp_o.

The OCP 82 includes an inverter 110, transfer gates 111 and 112, and a comparator 113. When the voltage Vcs when the power transistor 40 is off is lower than the reference voltage VREF0, the OPP 60a causes the OCP 82 to switch the reference voltage ocp_ref to a reference voltage VREF3 to adjust the predetermined current. On the other hand, when the voltage Vcs when the power transistor 40 is off is higher than the reference voltage VREF0, the OPP 60a causes the OCP 82 to switch the reference voltage ocp_ref to a reference voltage VREF2 to adjust the predetermined current such that the predetermined current increases. The reference voltage VREF2 is higher than the reference voltage VREF3.

Accordingly, the OPP 60a causes the OCP 82 to reduce the reference voltage ocp_ref to the reference voltage VREF3, the reference voltage ocp_ref being a reference for determining that the inductor current IL flowing through the power transistor 40 while the control IC 42a operates in the "OPP mode" is larger than the predetermined current.

This enables the control IC 42a to limit the output power in the "OPP mode". Additionally, this eliminates the need for selecting components of the AC-DC converter 10a in case of the low output voltage Vout, considering that the output current Iout increases when the output voltage Vout is low. The OCP 82 corresponds to a "second detection circuit".

<<<Configuration of Oscillator Circuit 80>>>

Figure 5:
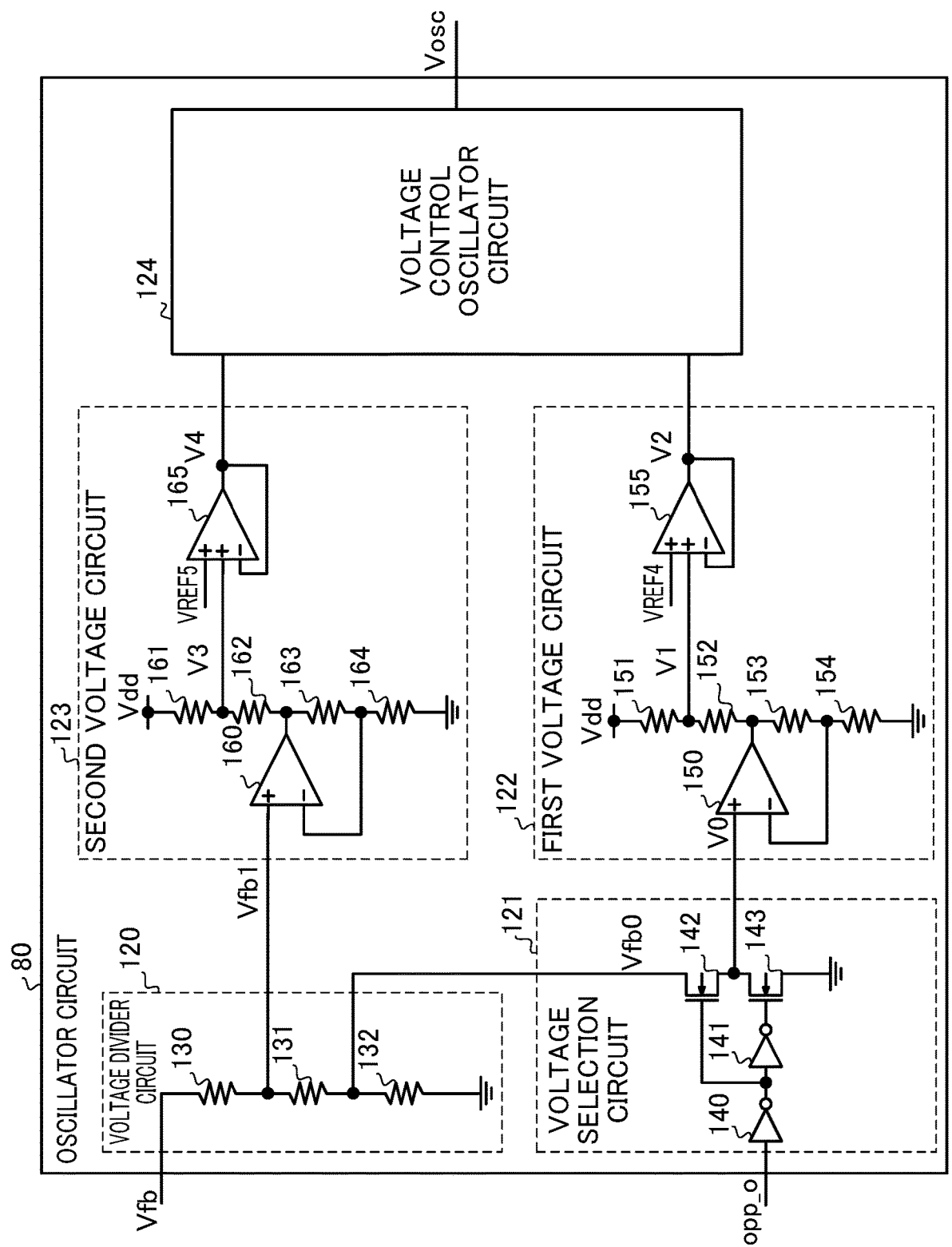
FIG. 5 is a diagram illustrating an example of a configuration of an oscillator circuit 80.

FIG. 5 is a diagram illustrating an example of a configuration of the oscillator circuit 80. The oscillator circuit 80 outputs the oscillation signal Vosc with the frequency Fsw corresponding to the voltage Vfb or the frequency Fsw0. In specific, when receiving the high signal opp_o (i.e., in the "OPP mode"), the oscillator circuit 80 outputs the oscillation signal Vosc with the frequency Fsw0 regardless of a change in the voltage Vfb. On the other hand, when receiving the low signal opp_o (i.e., in the "normal mode"), the oscillator circuit 80 outputs the oscillation signal Vosc with the frequency Fsw that is equal to or higher than the frequency Fsw0 and that corresponds to the voltage Vfb. In other words, while receiving the low signal opp_o, the oscillator circuit 80 raises the frequency of the oscillation signal Vosc from the frequency Fsw0 through the frequency Fsw1 to the frequency Fsw2 in stages based on the voltage Vfb that changes with a drop in the output voltage Vout.

The oscillator circuit 80 includes a voltage divider circuit 120, a voltage selection circuit 121, a first voltage circuit 122, a second voltage circuit 123, and a voltage control oscillator circuit 124.

The voltage divider circuit 120 divides the voltage Vfb and generates voltages Vfb0 and Vfb1. The voltage divider circuit 120 divides the voltage Vfb such that the voltage Vfb0 is lower than the voltage Vfb1 and outputs resultant voltages.

The voltage divider circuit 120 includes resistors 130 to 132. The voltage divider circuit 120 has one end to receive the voltage Vfb and the other end grounded. The resistors 130 to 132 are coupled in series between the one end and the other end. The voltage divider circuit 120 generates the voltage Vfb1 at a coupling point at which the resistor 130 and the resistor 131 are coupled, and generates the voltage Vfb0 at a coupling point at which the resistor 131 and the resistor 132 are coupled.

The voltage selection circuit 121 outputs the voltage Vfb0 or the ground voltage as a voltage V0 according to the logic level of the signal opp_o outputted by the OPP 60a. In specific, when the OPP 60a outputs the low signal opp_o, the voltage selection circuit 121 outputs the voltage Vfb0 as the voltage V0. On the other hand, when the OPP 60a outputs the high signal opp_o, the voltage selection circuit 121 outputs the ground voltage as the voltage V0.

The voltage selection circuit 121 includes inverters 140 and 141 and NMOS transistors 142 and 143. When the OPP 60a outputs the low signal opp_o, the NMOS transistor 142 is turned on, and the voltage selection circuit 121 outputs the voltage Vfb0 as the voltage V0. On the other hand, when the OPP 60a outputs the high signal opp_o, the NMOS transistor 143 is turned on, and the voltage selection circuit 121 outputs the ground voltage as the voltage V0.

The first voltage circuit 122 outputs the higher one of a voltage V1 corresponding to the voltage V0 and a reference voltage VREF4, as a voltage V2. In specific, when the voltage Vfb changes such that the voltage V1 corresponding to the voltage Vfb0 is lower than the reference voltage VREF4, the first voltage circuit 122 outputs the reference voltage VREF4 as the voltage V2. On the other hand, when the voltage Vfb changes such that the voltage V1 exceeds the reference voltage VREF4, the first voltage circuit 122 outputs the voltage V1 as the voltage V2. The first voltage circuit 122 includes operational amplifiers 150 and 155 and resistors 151 to 154.

The operational amplifier 150 and the resistors 151 to 154 output the voltage V1 which increases with an increase in the voltage V0. The operational amplifier 155 outputs, as the voltage V2, the higher one of the voltage V1 and the reference voltage VREF4 that are respectively coupled to two non-inverting inputs of the operational amplifier 155.

Accordingly, the operational amplifier 155, in other words, the first voltage circuit 122, outputs the reference voltage VREF4 as the voltage V2 until the voltage V0 rises and the voltage V1 becomes equal to the reference voltage VREF4, and upon the voltage V1 exceeding the reference voltage VREF4, the operational amplifier 155 outputs the voltage V1 as the voltage V2.

The second voltage circuit 123 outputs the higher one of a voltage V3 corresponding to the voltage Vfb1 and a reference voltage VREF5, as a voltage V4. In specific, when the voltage Vfb changes such that the voltage V3 corresponding to the voltage Vfb1 is lower than the reference voltage VREF5, the second voltage circuit 123 outputs the reference voltage VREF5 as the voltage V4. On the other hand, when the voltage Vfb changes such that the voltage V3 exceeds the reference voltage VREF5, the second voltage circuit 123 outputs the voltage V3 as the voltage V4. The second voltage circuit 123 includes operational amplifiers 160 and 165 and resistors 161 to 164.

The operational amplifier 160 corresponds to the operational amplifier 150, the resistors 161 to 164 correspond to the resistors 151 to 154, and the operational amplifier 165 corresponds to the operational amplifier 155. The voltage Vfb1 corresponds to the voltage V0, and the voltage V4 corresponds to the voltage V2. Thus, the second voltage circuit 123 operates similarly to the first voltage circuit 122.

The voltage control oscillator circuit 124 outputs the oscillation signal Vosc with a frequency Fsw that is based on the voltage V2 or V4 or a reference voltage VREF6.

<<<Configuration of Voltage Control Oscillator Circuit 124>>>

Figure 6:
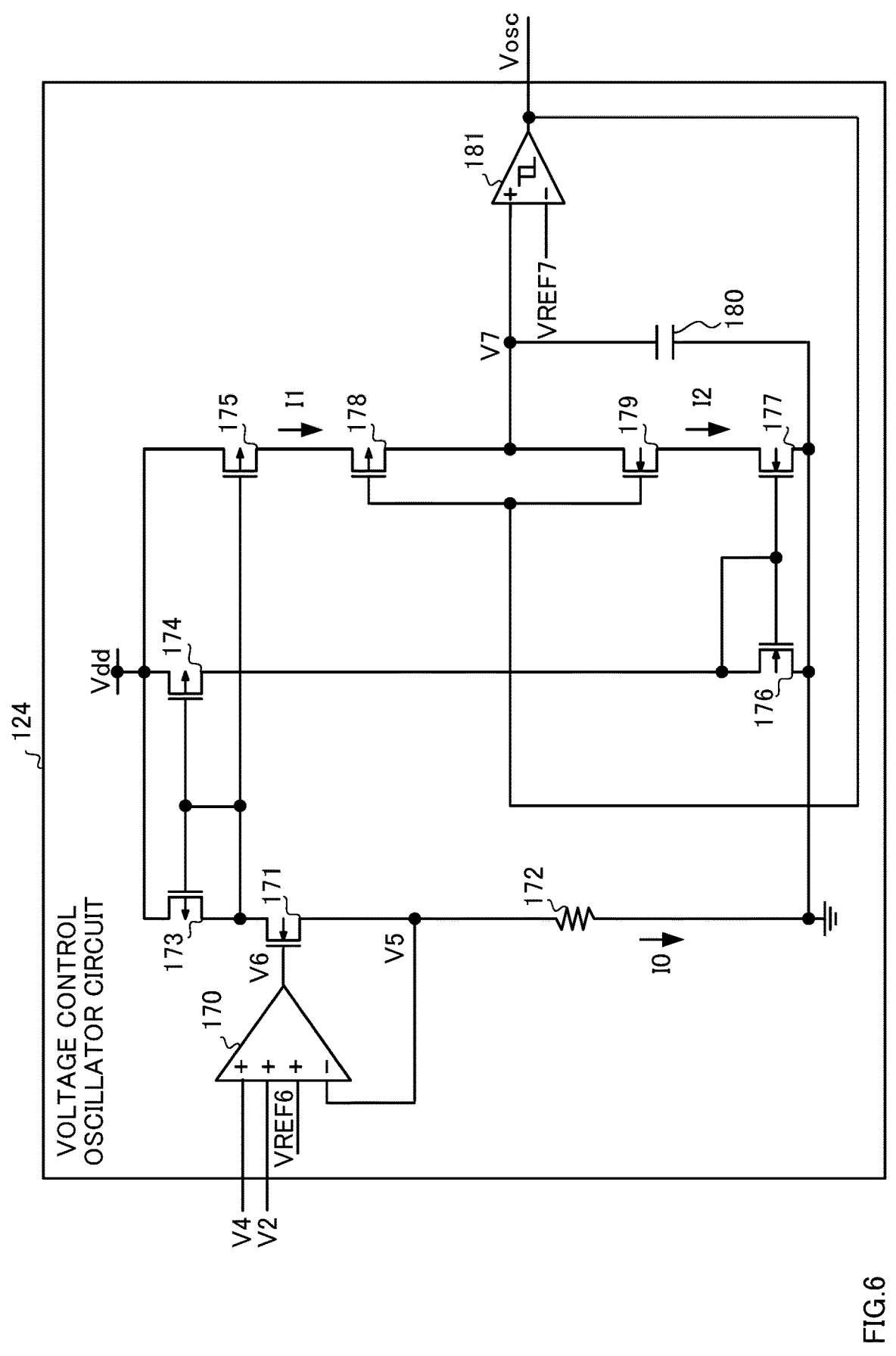

FIG. 6 is a diagram illustrating an example of a configuration of the voltage control oscillator circuit 124. The voltage control oscillator circuit 124 outputs the oscillation signal Vosc with a frequency Fsw that is based on the lowest voltage among the voltages V2 and V4 and the reference voltage VREF6. Note that the reference voltage VREF4 is lower than the reference voltage VREF5, and the reference voltage VREF5 is lower than the reference voltage VREF6.

First, a description will be given of a change in the frequency of the oscillation signal Vosc that is outputted by the voltage control oscillator circuit 124 when the signal opp_o is low (i.e., in the "normal mode"). Thereafter, a configuration of the voltage control oscillator circuit 124 will be described.

When the signal opp_o is high (i.e., in the "OPP mode"), the voltage control oscillator circuit 124 outputs the oscillation signal Vosc with a predetermined frequency. The frequency of the signal Ss that causes the signal Sdrv for driving the power transistor 40 to go high will be described later with reference to FIGS. 10 and 11.

When the voltage Vfb changes such that the voltage V1 corresponding to the voltage Vfb0 is lower than the reference voltage VREF4, the voltage control oscillator circuit 124 outputs the oscillation signal Vosc with the frequency Fsw0 that is based on the reference voltage VREF4. When the voltage Vfb changes and the voltage V1 exceeds the reference voltage VREF4, the voltage control oscillator circuit 124 outputs the oscillation signal Vosc with a frequency Fsw that is based on the voltage V1, which is higher than the frequency Fsw0. Note that the voltage of the voltage Vfb when the voltage V1 is equal to the reference voltage VREF4 is defined as a voltage Vfba.

When the voltage Vfb changes such that the voltage V1 exceeds the reference voltage VREF5, the voltage control oscillator circuit 124 outputs the oscillation signal Vosc with the frequency Fsw1 that is based on the reference voltage VREF5. When the voltage Vfb changes such that the voltage V3 exceeds the reference voltage VREF5, the voltage control oscillator circuit 124 outputs the oscillation signal Vosc with a frequency Fsw that is based on the voltage V3, which is higher than the frequency Fsw1. Note that the voltage of the voltage Vfb when the voltage V1 is equal to the reference voltage VREF5 is defined as a voltage Vfbb, and the voltage of the voltage Vfb when the voltage V3 is equal to the reference voltage VREF5 is defined as a voltage Vfbc.

When the voltage Vfb changes such that the voltage V3 exceeds the reference voltage VREF6, the voltage control oscillator circuit 124 outputs the oscillation signal Vosc with the frequency Fsw2 that is based on the reference voltage VREF6. Note that the voltage of the voltage Vfb when the voltage V3 is equal to the reference voltage VREF6 is defined as a voltage Vfbd.

The voltage control oscillator circuit 124 includes an operational amplifier 170, NMOS transistors 171, 176, 177, and 179, a resistor 172, PMOS transistors 173, 174, 175, and 178, a capacitor 180, and a hysteresis comparator 181.

The operational amplifier 170 adjusts a gate voltage V6 of the NMOS transistor 171 such that the lowest voltage among the voltages V2 and V4 and the reference voltage VREF6, which are respectively applied to three non-inverting inputs of operational amplifier 170, is equal to a voltage V5 at a node to which an inverting input thereof is coupled. As a result, assuming that a current flowing through the resistor 172 is a current I0, the voltage generated across the resistor 172 with the current I0 flowing through the resistor 172 results in the voltage V5.

The PMOS transistors 173 to 175 configure a current mirror circuit. The PMOS transistor 174 passes a current corresponding to the current I0 flowing through the PMOS transistor 173, and the PMOS transistor 175 passes a current I1 corresponding to the current I0 flowing through the PMOS transistor 173 when the PMOS transistor 178 is turned on.

The NMOS transistors 176 and 177 also configure a current mirror circuit. The NMOS transistor 176 passes a current flowing through the PMOS transistor 174. The NMOS transistor 177 passes a current I2 corresponding to the current flowing through the PMOS transistor 174 and the NMOS transistor 176 when the NMOS transistor 179 is turned on.

The PMOS transistor 178 and the NMOS transistor 179 are turned on and off according to the logic level of the oscillation signal Vosc. When the oscillation signal Vosc is low, the PMOS transistor 178 is turned on, and the capacitor 180 is charged with the current I1. Note that, in this case, the NMOS transistor 179 is tuned off.

On the other hand, when the oscillation signal Vosc is high, the NMOS transistor 179 is turned on, and the capacitor 180 is discharged with the current I2. Note that, in this case, the PMOS transistor 178 is tuned off.

The hysteresis comparator 181 compares the voltage across the capacitor 180 to a high threshold voltage Vthh or a low threshold voltage Vthl generated based on a reference voltage VREF7, and when the voltage across the capacitor 180 is higher than the high threshold voltage Vthh, the hysteresis comparator 181 outputs the high oscillation signal Vosc. On the other hand, when the voltage across the capacitor 180 is lower than the low threshold voltage Vthl, the hysteresis comparator 181 outputs the low oscillation signal Vosc.

There has been described that the voltage control oscillator circuit 124 outputs the oscillation signal Vosc with the frequency Fsw that changes with the voltage Vfb when the signal opp_o is low. As is clear from the above-described circuit configuration of the voltage control oscillator circuit 124, the larger the voltage value of the voltage V5, in other words, the voltage value of the lowest voltage among the voltages V2 and V4 and the reference voltage VREF6, the larger the current I0 to be passed through the resistor 172 by the operational amplifier 170. As a result, the currents I1 and I2 also increase. When the currents I1 and I2 increase, the capacitor 180 is charged and discharged faster, and thus the voltage control oscillator circuit 124 outputs the oscillation signal Vosc with a higher frequency Fsw.

Next, a description will be given of an operation of the voltage control oscillator circuit 124 when the signal opp_o is high (i.e., in the "OPP mode"). When the signal opp_o is high, the voltage selection circuit 121 outputs the ground voltage as the voltage V0.

Upon receiving the voltage V0 that is the ground voltage, the first voltage circuit 122 generates the voltage V1 lower than the reference voltage VREF4. As a result, the first voltage circuit 122 outputs the reference voltage VREF4 as the voltage V2.

Upon receiving the voltage V2 that is the reference voltage VREF4, the voltage control oscillator circuit 124 outputs the oscillation signal Vosc with the frequency Fsw0 regardless of a change in the voltage Vfb because the reference voltage VREF4 is lower than the reference voltages VREF5 and VREF6.

<<<Frequency Fsw of Signal Ss in "Normal Mode">>>

Figures 7A, 7B:
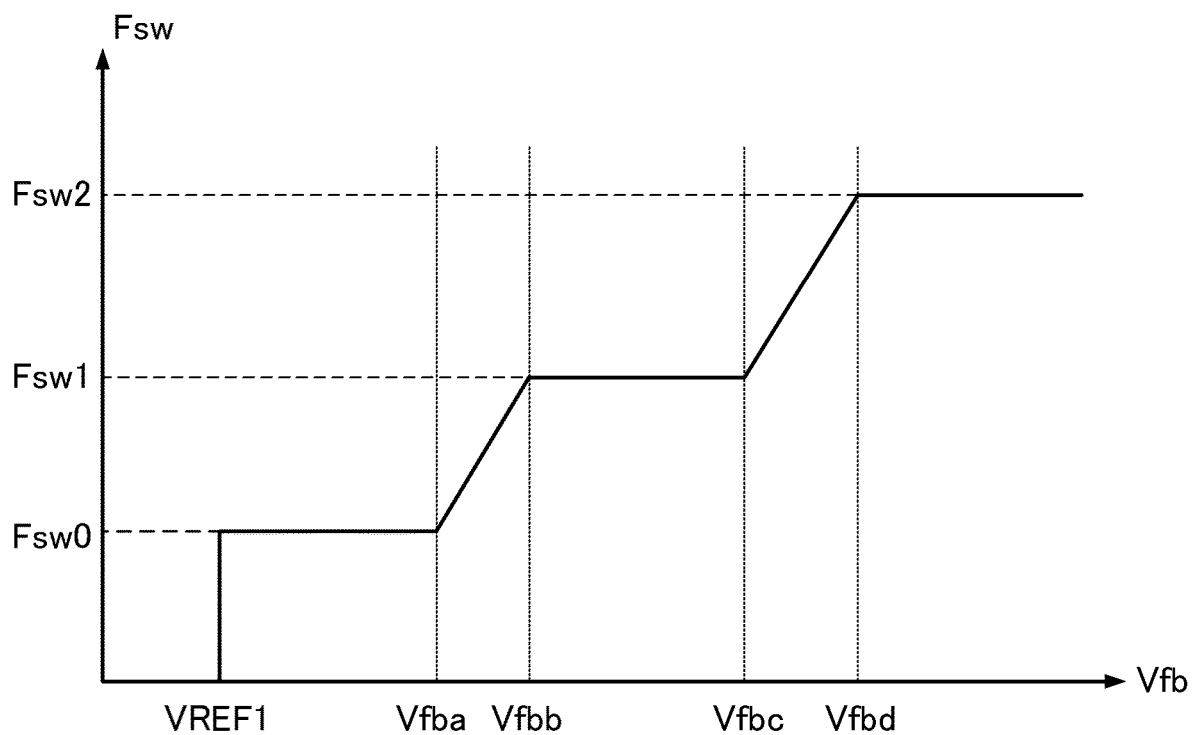
FIG. 7A is a diagram illustrating a change in an oscillation frequency Fsw of a signal Ss in a "normal mode".
FIG. 7B is a table illustrating a relationship between voltages V1 and V3 and reference voltages VREF4 to VREF6 when a voltage Vfb is one of voltages Vfba to Vfbd.

FIG. 7A is a diagram illustrating a change in the oscillation frequency Fsw of the signal Ss in the "normal mode". FIG. 7B is a table illustrating a relationship between the voltages V1 and V3 and the reference voltages VREF4 to VREF6 when the voltage Vfb is one of the voltages Vfba to Vfbd. As described above, in the "normal mode", the oscillator circuit 80 outputs the oscillation signal Vosc with the frequency Fsw according to the voltage Vfb.

As described above, when the one shot circuit 90 receives the oscillation signal Vosc, and the voltage Vfb is higher than the reference voltage VREF1, the one shot circuit 90 outputs the pulse signal Ss. On the other hand, the one shot circuit 90 does not output the pulse signal Ss when the voltage Vfb is lower than the reference voltage VREF1.

In specific, when the voltage Vfb is lower than the reference voltage VREF1, no pulse signal Ss is outputted. When the voltage Vfb is higher than the reference voltage VREF1 and lower than the voltage Vfba, in other words, when the voltage V1 is lower than the reference voltage VREF4, the frequency Fsw of the pulse signal Ss is a frequency Fsw0 that is based on the reference voltage VREF4.

When the voltage Vfb is the voltage Vfba, the voltage V1 is the reference voltage VREF4, and the frequency of the pulse signal Ss is a frequency Fsw0 that is based on the voltage V1.

When the voltage Vfb is higher than the voltage Vfba and lower than the voltage Vfbb, in other words, when the voltage V1 is higher than the reference voltage VREF4 and lower than the reference voltage VREF5, the frequency Fsw of the pulse signal Ss increases in proportion to a rise in the voltage Vfb (i.e., a rise in the voltage V1).

When the voltage Vfb is the voltage Vfbb, the voltage V1 is the reference voltage VREF5, and the frequency of the pulse signal Ss is the frequency Fsw1 that is based on the reference voltage VREF5.

When the voltage Vfb is higher than the voltage Vfbb and lower than the voltage Vfbc, in other words, when the voltage V3 is lower than the reference voltage VREF5, the frequency Fsw of the pulse signal Ss is the frequency Fsw1 that is based on the reference voltage VREF5.

When the voltage Vfb is the voltage Vfbc, the voltage V3 is the reference voltage VREF5, and the frequency of the pulse signal Ss is the frequency Fsw1 that is based on voltage V3.

When the voltage Vfb is higher than the voltage Vfbc and lower than the voltage Vfbd, in other words, when the voltage V3 is higher than the reference voltage VREF5 and lower than the reference voltage VREF6, the frequency Fsw of the pulse signal Ss increases in proportion to a rise in the voltage Vfb (i.e., rise in the voltage V3).

When the voltage Vfb is the voltage Vfbd, the voltage V3 is the reference voltage VREF6, and the frequency of the pulse signal Ss is the frequency Fsw2 that is based on the reference voltage VREF6.

Lastly, when the voltage Vfb is higher than the voltage Vfbd, in other words, when the voltage V3 is higher than the reference voltage VREF6, the frequency Fsw of the pulse signal Ss is the frequency Fsw2 that is based on the reference voltage VREF6.

<<<Frequency Fsw of Signal Ss in "OPP Mode">>>

Figure 8:
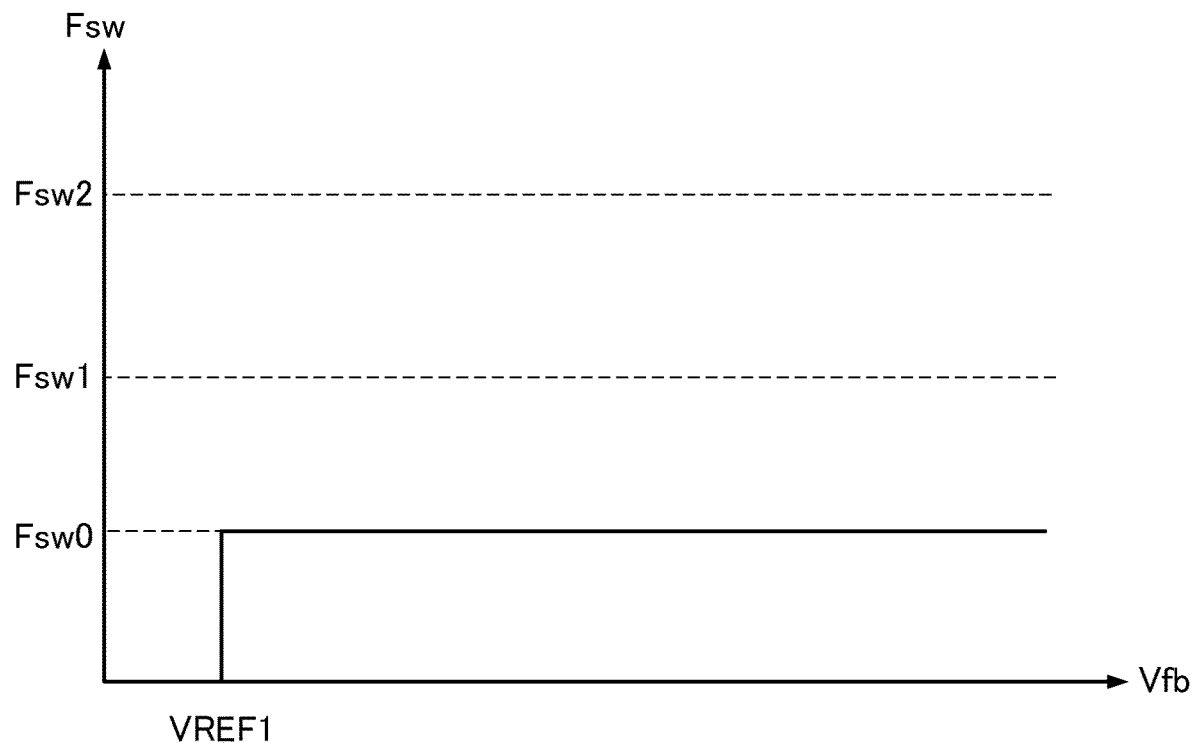
FIG. 8 is a diagram illustrating a change in an oscillation frequency Fsw of a signal Ss in an "OPP mode".

FIG. 8 is a diagram illustrating a change in the oscillation frequency Fsw of the signal Ss in the "OPP mode". As described above, in the "OPP mode", the oscillator circuit 80 outputs the oscillation signal Vosc with the frequency Fsw0 regardless of a change in the voltage Vfb.

As described above, when the one shot circuit 90 receives the oscillation signal Vosc, and the voltage Vfb is higher than the reference voltage VREF1, the one shot circuit 90 outputs the pulse signal Ss with the frequency Fsw0. On the other hand, the one shot circuit 90 does not output the pulse signal Ss when the voltage Vfb is lower than the reference voltage VREF1.

Note that the frequency Fsw0 corresponds to a "first frequency", the frequency Fsw1 corresponds to a "second frequency", and the frequency Fsw2 corresponds to a "third frequency".

<<<Operation of Control IC 42a in "Normal Mode">>>

Figure 9:
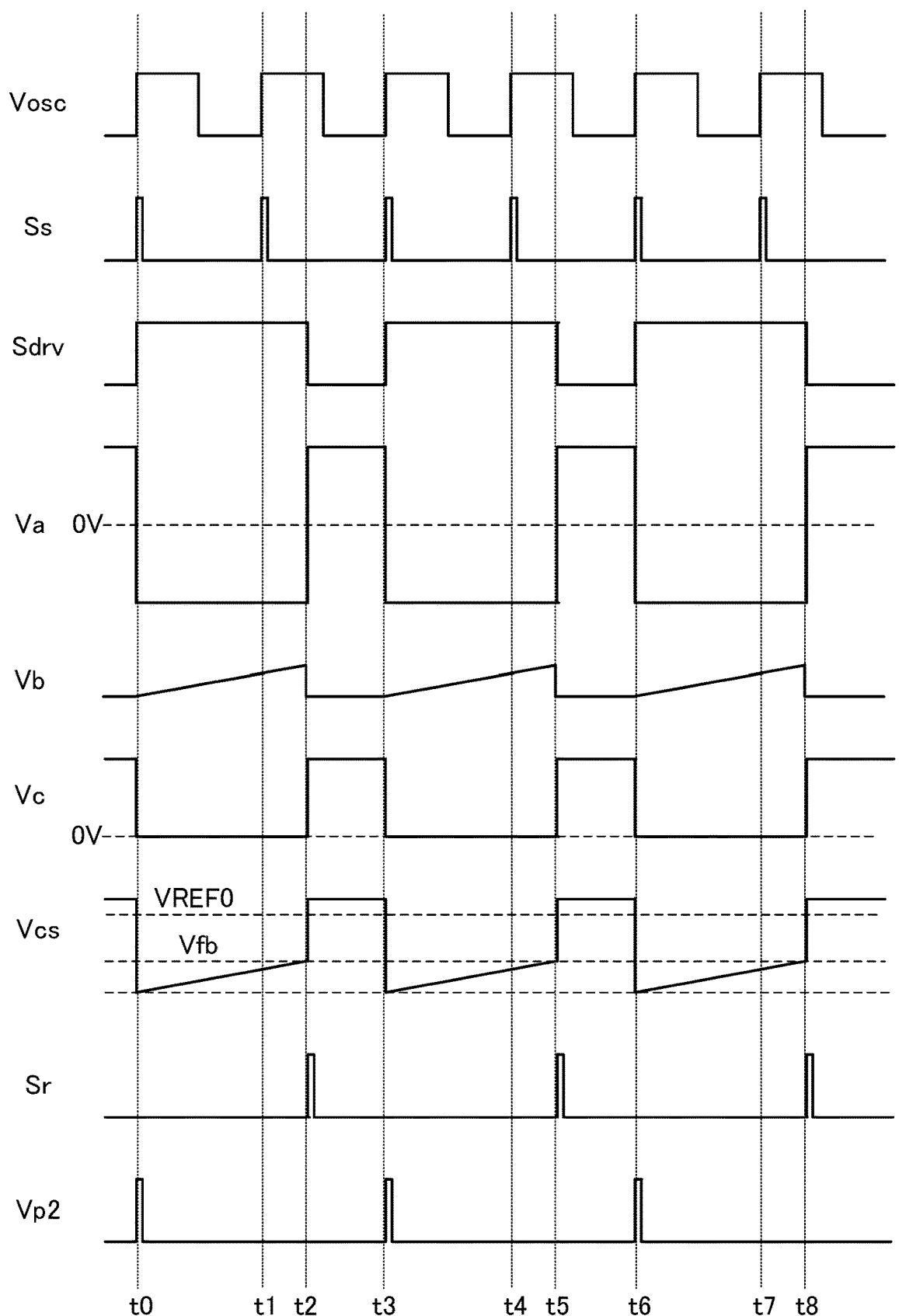
FIG. 9 is a diagram illustrating an example of an operation of a control IC 42a in a "normal mode".

FIG. 9 is a diagram illustrating an example of an operation of the control IC 42a in the "normal mode". For the sake of simplifying the descriptions, it is assumed that the inductor current IL flowing through the power transistor 40 does not become overcurrent. Accordingly, it is assumed that the timing at which the power transistor 40 is turned off is determined based on the voltage Vcs when the power transistor 40 is on and the voltage Vfb.

It is also assumed that the voltage Vfb is higher than the reference voltage VREF1, and that the one shot circuit 90 outputs the pulse signal Ss. It is also assumed that the OR circuit 94 does not output the high signal Soff, and that the buffer 93 outputs the driving signal Vg to switch the power transistor 40. Note that the voltage generated across the resistor 41 is defined as a voltage Vb, and the voltage at a cathode of the diode 45 is defined as a voltage Vc. The voltage Vc is applied to the capacitor 43 through the resistor 46.

Since the control IC 42a is operating in the "normal mode", the AC-DC converter 10a applies the output voltage Vout at a first target level (e.g., 32 V) to the motor 30.

Upon the oscillator circuit 80 outputting the high oscillation signal Vosc based on the frequency according to the voltage Vfb at time t0, the one shot circuit 90 outputs the pulse signal Ss. Then, upon receiving the pulse signal Ss, the OR circuit 92 outputs the high signal Sdrv, and upon receiving the pulse signal Ss, the SR flip-flop 91 outputs the high signal Vp1.

This causes the power transistor 40 to be turned on, and thus the inductor current IL flows through the primary coil L1. Then, when the inductor current IL flows through the power transistor 40, the voltage Vb corresponding to the inductor current IL is generated across the resistor 41.

Then, when receiving the high signal Sdrv, the discharge circuit 88 discharges the charge in the capacitor 43. As a result, the voltage Vcs becomes 0 V. Thereafter, since the voltage Vb generated across the resistor 41 rises with an increase in the inductor current IL, the voltage Vcs rises gradually.

When the inductor current IL flows through the primary coil L1, the voltage Va having a polarity opposite to that of the voltage generated across the primary coil L1 is generated across the auxiliary coil L3.

In this case, the voltage Va is a negative voltage, and thus no current flows through the capacitor 43 through the diode 45 and the resistor 46, and the auxiliary coil L3 does not charge the capacitor 43.

At time t1 at which the oscillator circuit 80 outputs the high oscillation signal Vosc, the one shot circuit 90 outputs the pulse signal Ss. However, since the SR flip-flop 91 has already outputted the high signal Vp1, the signal Sdrv remains high.

At time t2 at which the voltage Vcs rises to the voltage Vfb, the comparator 95 outputs the high signal Vr. Accordingly, the SR flip-flop 91 outputs the low signal Vp1, and the OR circuit 92 outputs the low signal Sdrv. Thus, the power transistor 40 is turned off. When the power transistor 40 is turned off, the inductor current IL does not flow through the primary coil L1.

When the inductor current IL stops flowing through the primary coil L1, the voltage generated across the primary coil L1 results in a voltage having a polarity opposite to the polarity at a time when the power transistor 40 is on. Thus, the voltage Va generated across the auxiliary coil L3 results in a positive voltage. Since no inductor current IL flows, the voltage Vb results in 0 V.

In this case, since the voltage Va is a positive voltage, the voltage Vc, which is transferred from the voltage Va through the diode 45 and the resistor 46, is a positive voltage. The voltage Vc is applied to the capacitor 43, and the capacitor 43 is charged with the voltage Va generated across the auxiliary coil L3. Since the voltage Vb is 0 V, the voltage Vcs results in the voltage Vc and becomes higher than the reference voltage VREF0.

Since the voltage Va is also used as a voltage for generating the power supply voltage Vcc of the control IC 42a, the voltage Va is higher than the voltage Vcs generated with the voltage Vb. The inductor current IL changes with a change in the output voltage Vout, and the voltage Va changes accordingly, and thus the voltage Vcs when the power transistor 40 is turned off also changes. Note that the period of time from time t0 to time t2 is defined as the on period Ton.

At and after time t3 at which the oscillator circuit 80 outputs the high oscillation signal Vosc, the operation from time t0 to time t3 is repeated. Note that the period of time from time t2 to time t3 is defined as an off period Toff.

Accordingly, in the on period Ton, the capacitor 43 is charged with the voltage Vb that is generated across the resistor 41 according to the inductor current IL. As a result, the voltage Vcs is a voltage corresponding to the inductor current IL.

Since no inductor current IL flows in the off period Toff, the capacitor 43 is not charged with the voltage Vb but charged with the voltage Va generated across the auxiliary coil L3. As a result, the voltage Vcs in the off period Toff is higher than the voltage Vcs in the on period Ton.

As described above, since the voltage Vcs when the power transistor 40 is off changes with the output voltage Vout, it is possible to detect a change in the output voltage Vout using the voltage Vcs, as in the case where a change in the output voltage Vout is detected using the power supply voltage Vcc.

<<<Operation of Control IC 42a in Mode Transition>>>

===Transition from "Normal Mode" to "OPP Mode"===

Figure 10:
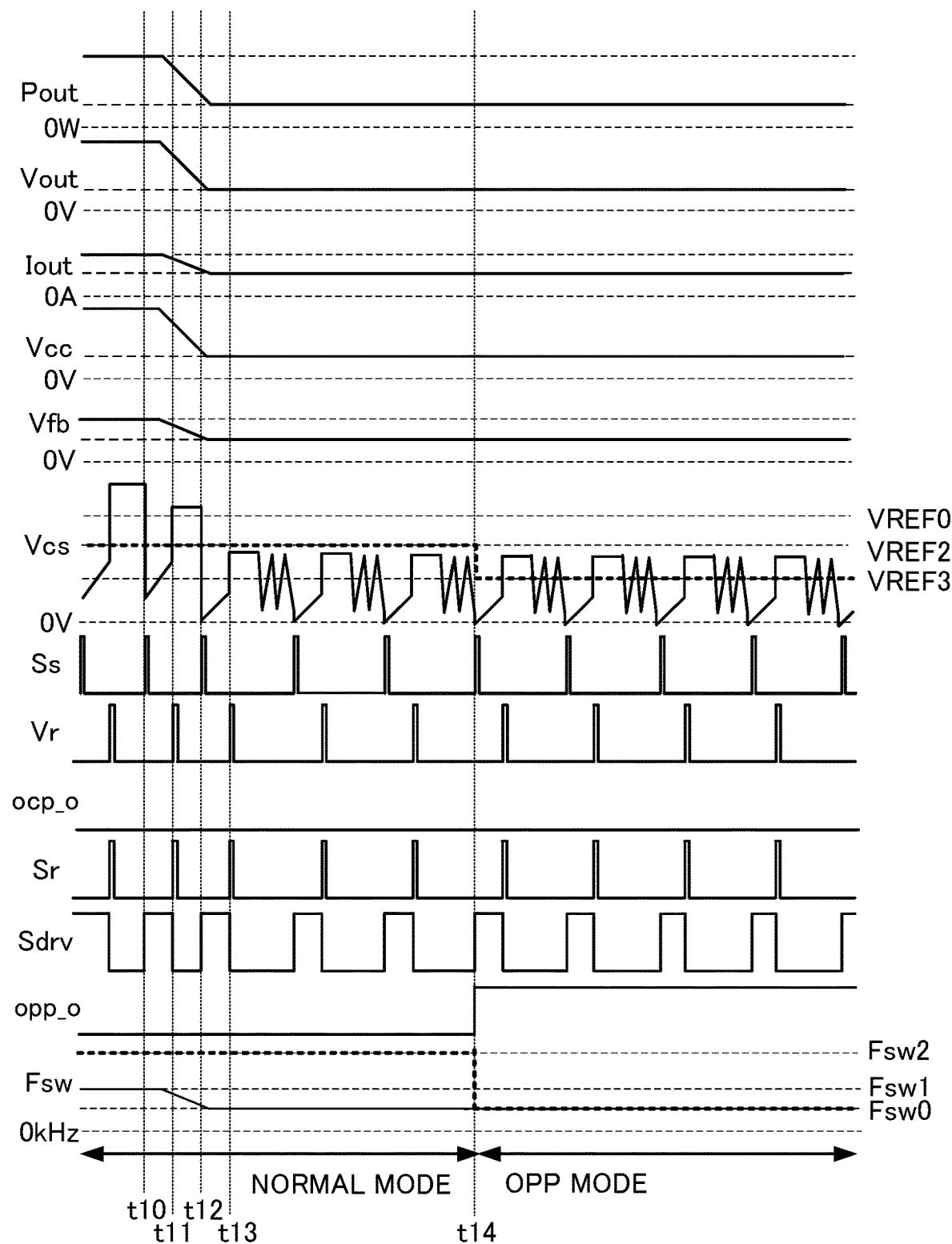
FIG. 10 is a diagram illustrating an example of an operation of a control IC 42a during a transition from a "normal mode" to an "OPP mode".

FIG. 10 is a diagram illustrating an example of an operation of the control IC 42a when transitioning from the "normal mode" to the "OPP mode". It is assumed that the voltage Vfb does not drop below the reference voltage VREF1. It is also assumed that the OR circuit 94 does not output the high signal Soff. For explanatory convenience, the cycle of the signal Sdrv is different from the cycle in an actual operation.

Upon the one shot circuit 90 outputting the pulse signal Ss at time t10, the OR circuit 92 outputs the high signal Sdrv. Accordingly, the power transistor 40 is turned on. Thereafter, in the AC-DC converter 10a, when the switch 29 is turned on in response to the external signal ExSig, the output voltage Vout starts dropping so as to reach a second target level (e.g., 12 V).

At time t11 at which the voltage Vcs when the power transistor 40 is on reaches the voltage Vfb, the comparator 95 outputs the high signal Vr, and the OR circuit 96 outputs the high signal Sr. Then, the SR flip-flop 91 outputs the low signal Vp1, and the OR circuit 92 outputs the low signal Sdrv. Accordingly, the power transistor 40 is turned off.

When the power transistor 40 is turned off, the voltage Vcs is charged from the auxiliary coil L3 through the diode 45 and the resistor 46. At this time, the output power Pout starts dropping, and the output voltage Vout also slightly decreases from the first target level (e.g., 32 V). However, since the output current Iout is large, the inductor current IL when the power transistor 40 is turned on is also large. Therefore, the voltage Va across the auxiliary coil L3 is also large, and the voltage Vcs when the power transistor 40 is off is higher than the reference voltage VREF0.

When the one shot circuit 90 outputs the pulse signal Ss at time t12 at which the output voltage Vout reaches the second target level (e.g., 12 V), the power transistor 40 is turned on as at time t10.

In this case, since the voltage between the output voltage Vout and the voltage at the cathode of the Zener diode 27 increases with the switch 29 being turned on, the intensity of the light emitted by the light-emitting diode 28 increases. Accordingly, the phototransistor 48 passes a larger sink current Ia, resulting in a decrease in the voltage Vfb. With the voltage Vfb decreasing to be lower than the voltage Vfba, the one shot circuit 90 starts outputting the pulse signal Ss with the frequency Fsw0.

At time t13 at which the voltage Vcs when the power transistor 40 is on reaches the dropped voltage Vfb, the power transistor 40 is turned off as at time t11. In this case, although the voltage Vcs is charged with the voltage Va from the auxiliary coil L3, the output power Pout has already dropped, and the output voltage Vout has also dropped, and thus the inductor current IL when the power transistor 40 is on decreases. Thus, the voltage Va across the auxiliary coil L3 also decreases, and the voltage Vcs when the power transistor 40 is off is lower than the reference voltage VREF0.

At time t14 at which the voltage Vcs when the power transistor 40 is off has been lower than the reference voltage VREF0 for a predetermined period of time since time t13, the OPP 60a outputs the high signal opp_o. At this time, the oscillator circuit 80 outputs the oscillation signal Vosc with the frequency Fsw0. Then, the OCP 82 switches the reference voltage ocp_ref from the reference voltage VREF2 to the reference voltage VREF3. Note that the control IC 42a operates in the "normal mode" before time t14 and operates in the "OPP mode" at and after time t14.

===Transition from "OPP Mode" to "Normal Mode"===

Figure 11:
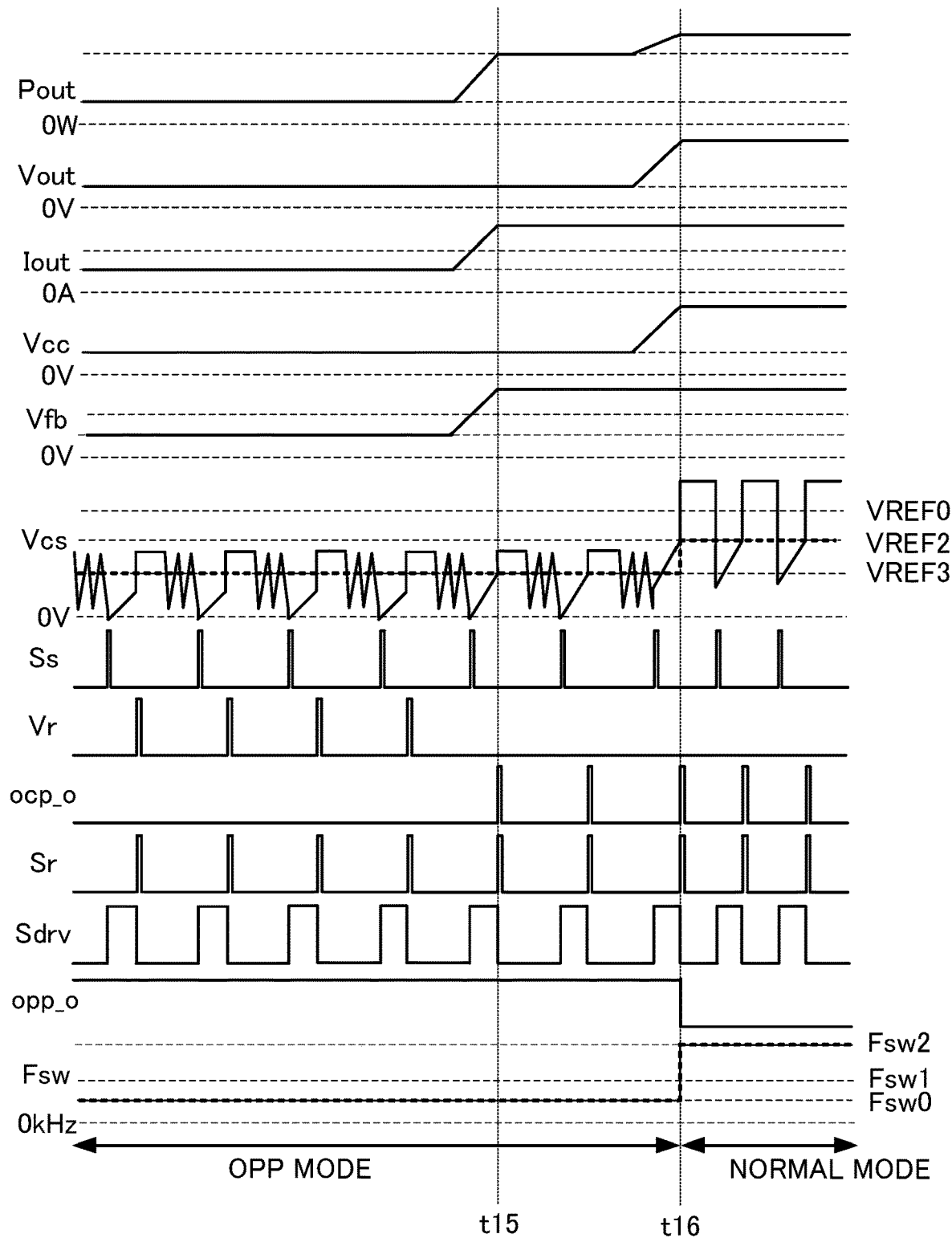
FIG. 11 is a diagram illustrating an example of an operation of the control IC 42a during a transition from an "OPP mode" to a "normal mode".

FIG. 11 is a diagram illustrating an example of an operation of the control IC 42a when transitioning from the "OPP mode" to the "normal mode". It is assumed that the control IC 42a operates in the "OPP mode" before time t15, and that the control IC 42a still operates in the "OPP mode" at and after time t15 until time t16. It is also assumed that the voltage Vfb does not drop below the reference voltage VREF1. In addition, it is assumed that the OR circuit 94 does not output the high signal Soff. As in FIG. 10, for explanatory convenience, the cycle of the signal Sdrv is different from the cycle in the actual operation.

When the output current Iout increases due to a sudden change in the load of the motor 30 and the like at time t15, the amount of the current flowing through the light-emitting diode 28 decreases, and the intensity of the light emitted by the light-emitting diode 28 decreases. Accordingly, the sink current Ia passed by the phototransistor 48 decreases, resulting in a rise in the voltage Vfb. In this case, the voltage Vfb exceeds the reference voltage VREF3 of the OCP 82 at a time when the signal opp_o is high.

As a result, the OCP 82 outputs the high signal ocp_o at time t15. When the high signal ocp_o is outputted, the SR flip-flop 91 outputs the low signal Vp1, and the OR circuit 92 outputs the low signal Sdrv. This is interpreted as the inductor current IL that flows through the power transistor 40 being overcurrent, and thus the power transistor 40 is turned off.

Upon the voltage Vcs when the power transistor 40 is off exceeding the reference voltage VREF0 at time t16, the OPP 60a outputs the low signal opp_o. Accordingly, when the voltage Vfb is higher than the voltage Vfbd, the oscillator circuit 80 outputs the oscillation signal Vosc with the frequency Fsw2. When the OPP 60a outputs the low signal opp_o, the OCP 82 switches the reference voltage ocp_ref to the reference voltage VREF2.

===Modification===

Figure 12:
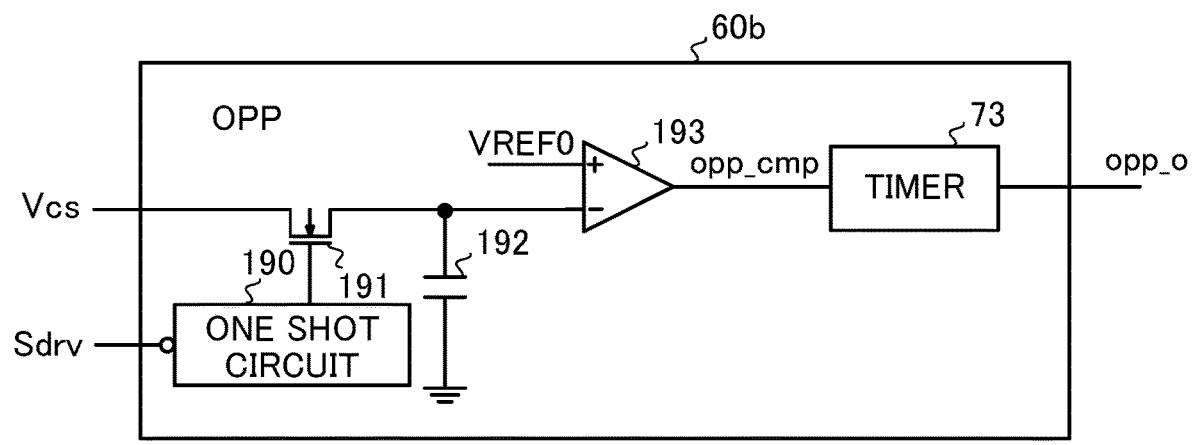

FIG. 12 is a diagram illustrating an OPP 60b, which is a modification of the OPP 60a. The OPP 60b includes a one shot circuit 190, an NMOS transistor 191, a capacitor 192, and a comparator 193, and the timer 73.

Upon the control circuit 62a outputting the low signal Sdrv, the one shot circuit 190 generates a pulse signal to turn on the NMOS transistor 191 at the falling edge of the signal Sdrv.

When the NMOS transistor 191 is turned on, a voltage corresponding to the voltage Vcs is applied to the capacitor 192. On the other hand, when the NMOS transistor 191 is turned off, the capacitor 192 holds the voltage corresponding to the voltage Vcs.

The comparator 193 compares the voltage across the capacitor 192 to the reference voltage VREF0, and when the voltage across the capacitor 192 is lower than the reference voltage VREF0, the comparator 193 outputs the high signal opp_cmp. On the other hand, when the voltage across the capacitor 192 is higher than the reference voltage VREF0, the comparator 193 outputs the low signal opp_cmp.

When receiving the high signal opp_cmp for a predetermined period of time, the timer 73 outputs the high signal opp_o. On the other hand, when receiving the low signal opp_cmp, the timer 73 outputs the low signal opp_o.

<<Other Embodiments of AC-DC Converter>>

Figure 13:
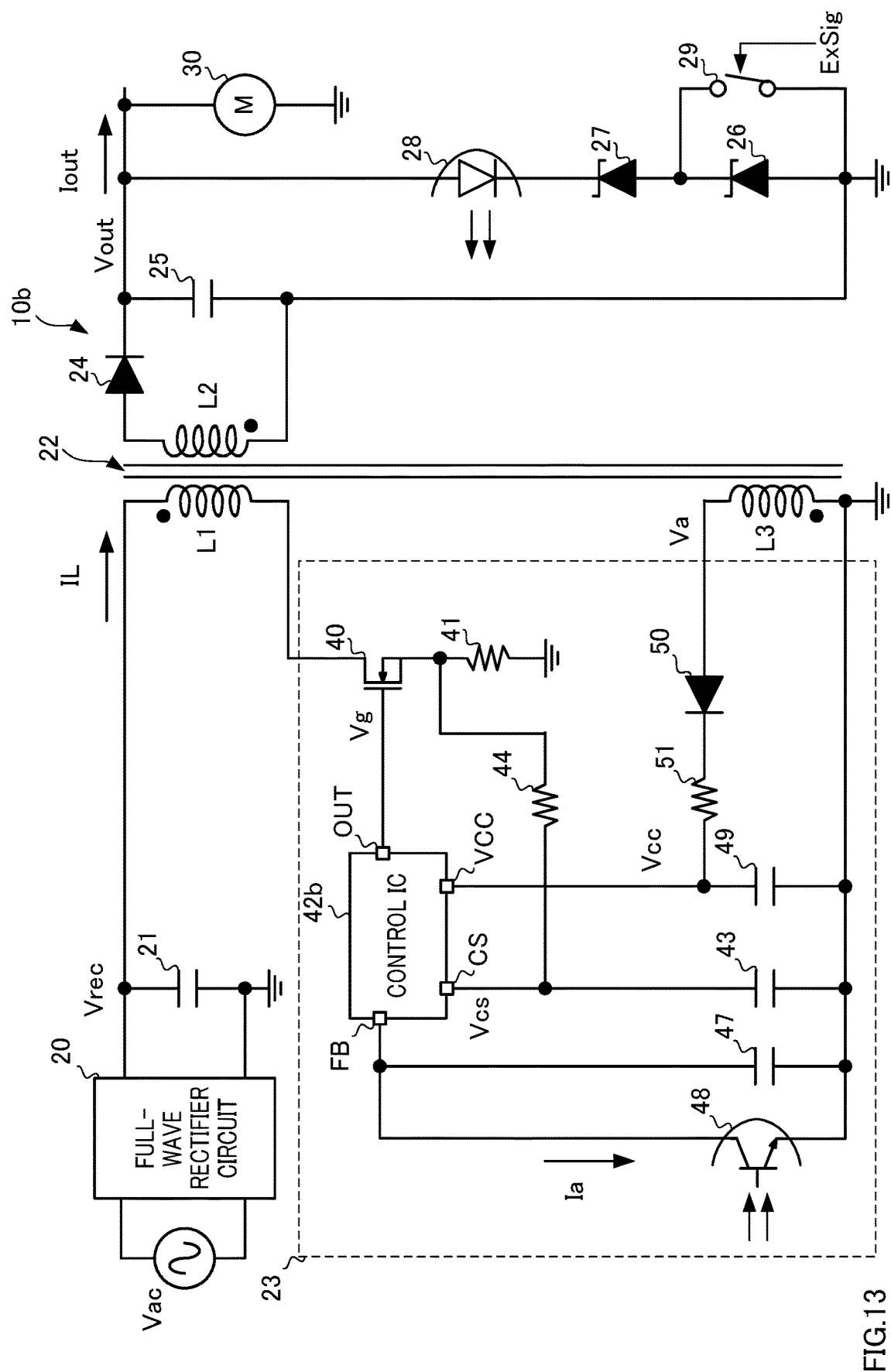
FIG. 13 is a diagram illustrating an example of a configuration of an AC-DC converter 10b.

FIG. 13 is a diagram illustrating an example of a configuration of an AC-DC converter 10b, which is a modification of the AC-DC converter 10a in FIG. 1. The AC-DC converter 10b is controlled by a control IC 42b, which is a modification of the control IC 42a, without including the diode 45 or the resistor 46 although the AC-DC converter 10a includes them. In an embodiment of the present disclosure, the configurations that are the same as or similar to those described above are given the same reference numerals and a description thereof may be omitted.

The control IC 42a described above in FIG. 2 detects a change in the target level of the output voltage Vout based on the voltage Vcs at the terminal CS. However, the voltage Vcs at the terminal CS does not necessarily have to be used for detecting a change in the target level of the output voltage Vout. The control IC 42b according to an embodiment of the present disclosure detects a change in the target level of the output voltage Vout based on the power supply voltage Vcc at the terminal VCC.

Figure 14:
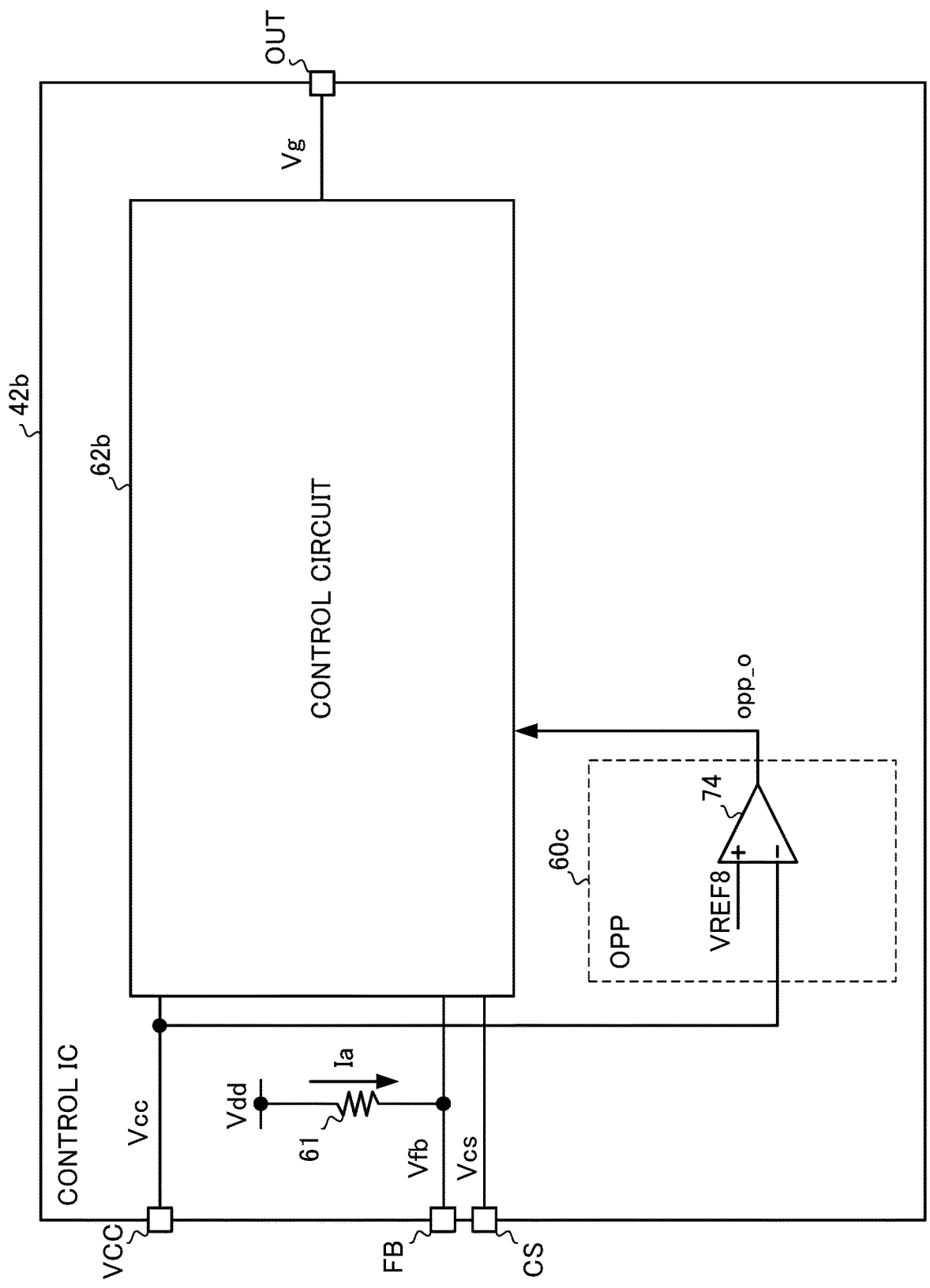
FIG. 14 is a diagram illustrating an example of a configuration of a control IC 42b.

FIG. 14 is a diagram illustrating an example of a configuration of the control IC 42b. The control IC 42b includes an OPP 60c, which is a modification of the OPP 60a, and a control circuit 62b, which is a modification of the control circuit 62a. Note that the resistor 61 and the terminals VCC, FB, CS, and OUT that are the same as those in FIG. 2 are given the same reference signs in FIG. 14.

The OPP 60c detects a change in the target level of the output voltage Vout based on the power supply voltage Vcc at the terminal VCC. In specific, when the power supply voltage Vcc drops below a reference voltage VREF8, the OPP 60c outputs the high signal opp_o.

On the other hand, when the power supply voltage Vcc exceeds the reference voltage VREF8, the OPP 60c outputs the low signal opp_o. The OPP 60c includes a comparator 74. The comparator 74 compares the power supply voltage Vcc to the reference voltage VREF8, and when the power supply voltage Vcc is higher than the reference voltage VREF8, the comparator 74 outputs the low signal opp_o. On the other hand, when the power supply voltage Vcc is lower than the reference voltage VREF8, the comparator 74 outputs the high signal opp_o. Note that the OPP 60c corresponds to a "detection circuit".

Figure 15:
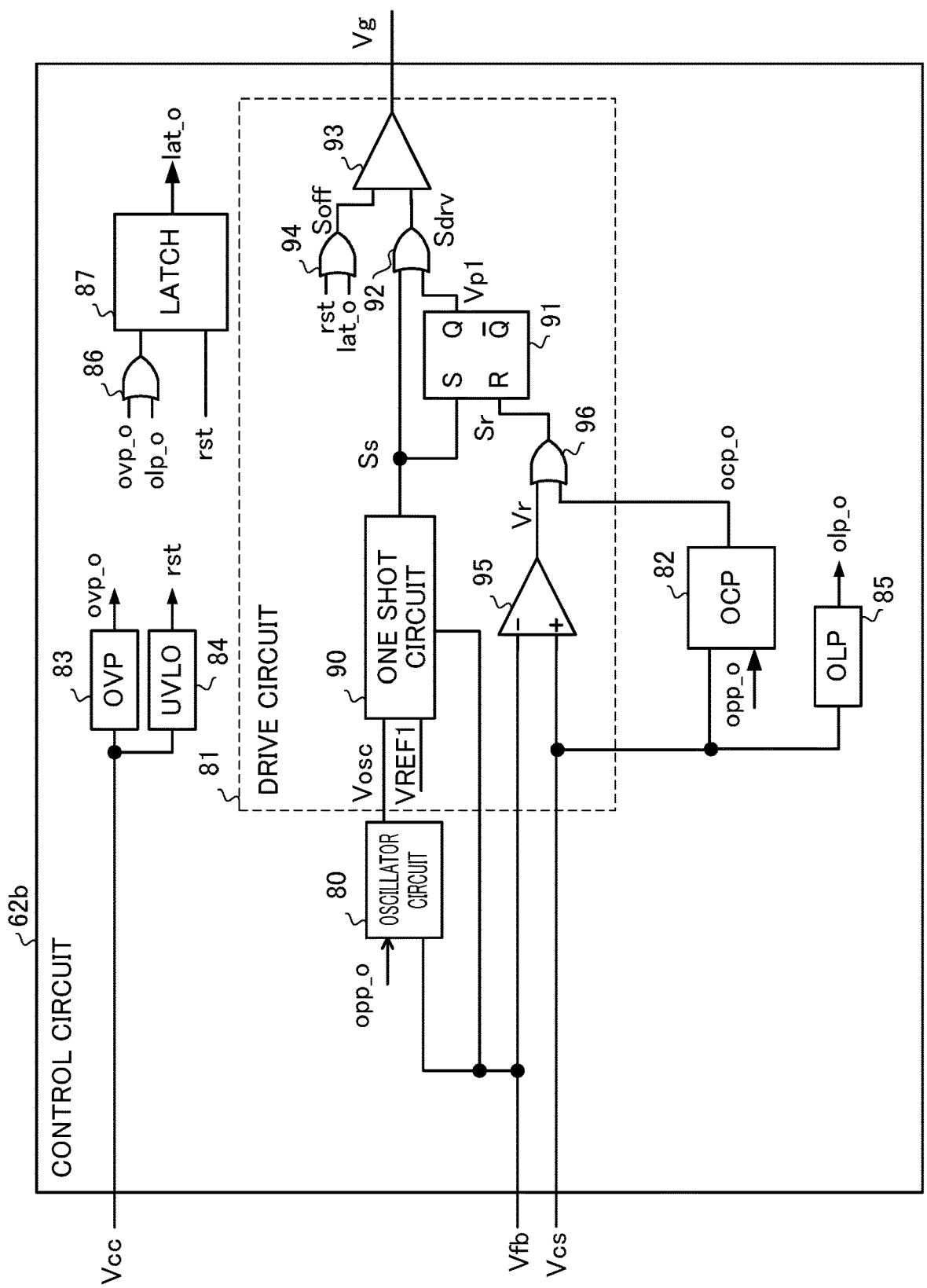
FIG. 15 is a diagram illustrating an example of a configuration of a control circuit 62b.

FIG. 15 is a diagram illustrating an example of a configuration of a control circuit 62b, which is a modification of the control circuit 62a in FIG. 3. The control IC 42b does not operate if the power supply voltage Vcc applied to the terminal VCC is discharged. Thus, the discharge circuit 88 in FIG. 3 is not included in the control circuit 62b in FIG. 15. A description of other configurations that are the same as those described above is omitted.

As has been described above, the OPP 60c in the control IC 42b according to an embodiment of the present disclosure detects the voltage Vcc at the terminal VCC, and thus the control IC 42b can detect a change in the target level of the output voltage Vout based on the voltage Vcc.

Further, in an embodiment of the present disclosure, the OCP 82 determines whether the inductor current IL flowing through the power transistor 40 is overcurrent. The reference voltage ocp_ref, which is the determination threshold of the OCP 82 for determining overcurrent, is switched to the reference voltage VREF2 or VREF3 in response to the signal opp_o that is the result of the detection performed by the OPP 60c using the reference voltage VREF8. Note that the OCP 82 corresponds to an "overcurrent detection circuit".

<<<Operation of Control IC 42b in Mode Transition>>>
===Transition from "Normal Mode" to "OPP Mode"===

Figure 16:
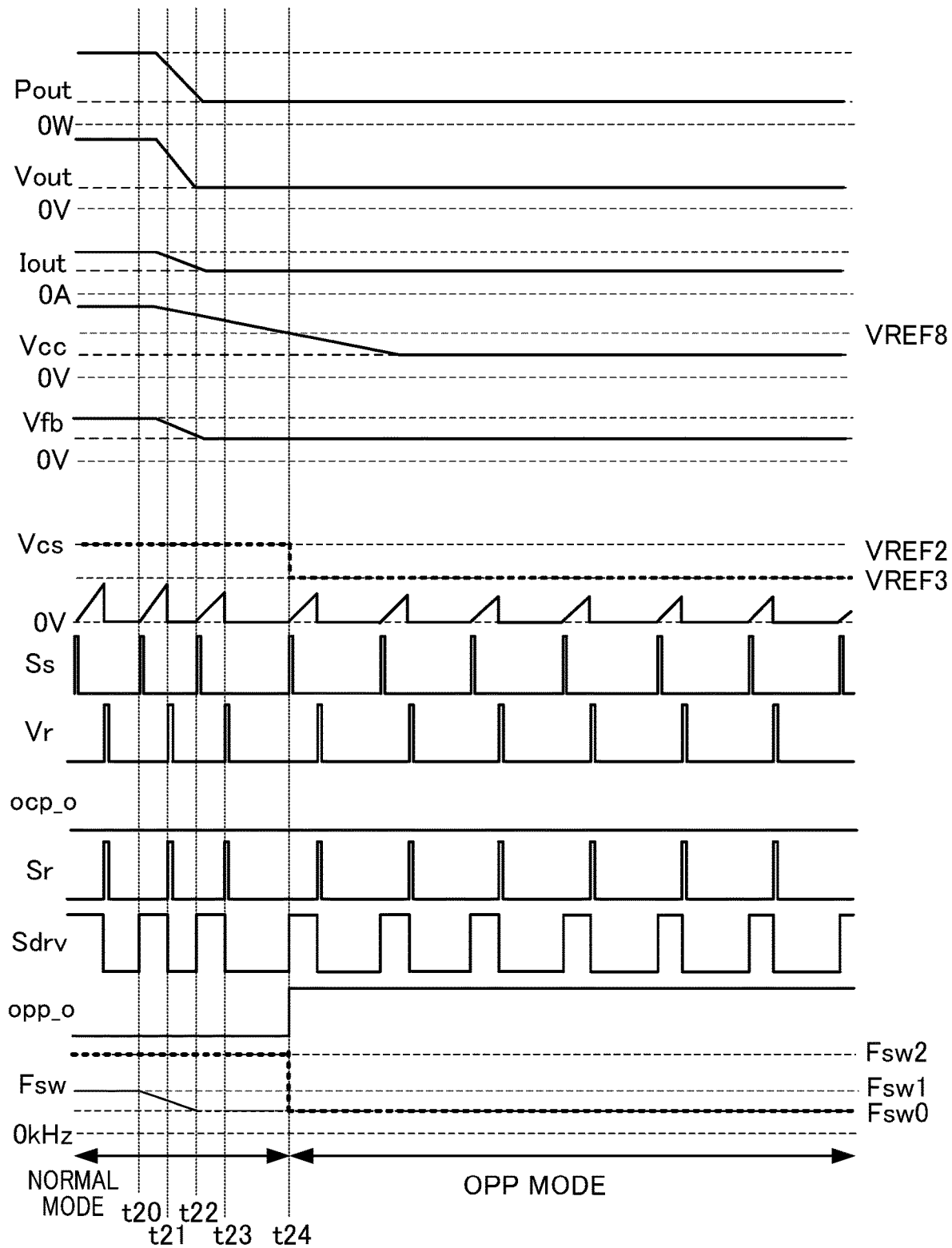
FIG. 16 is a diagram illustrating an example of an operation of a control IC 42b during a transition from a "normal mode" to an "OPP mode".

FIG. 16 is a diagram illustrating an example of an operation of the control IC 42b when transitioning from the "normal mode" to the "OPP mode". It is assumed that the voltage Vfb does not drop below the reference voltage VREF1. It is also assumed that the OR circuit 94 does not output the high signal Soff. For explanatory convenience, the cycle of the signal Sdrv is different from the cycle in the actual operation.

Times t20 to t24 in FIG. 16 are illustrated so as to correspond to times t10 to t14 in FIG. 10. In addition, the drop in the voltage Vcc is illustrated so as to be gradual, which is different from the actual drop in the voltage Vcc. Operations that are different between FIG. 16 and FIG. 10 will be described below.

At time t21 at which the voltage Vcs when the power transistor 40 is on becomes equal to the voltage Vfb, the power transistor 40 is turned off. When the power transistor 40 is turned off, the voltage Vcc is charged from the auxiliary coil L3 through the diode 50 and the resistor 51. In this case, the drop in the output power Pout is started, and the output voltage Vout also slightly drops from the first target level (e.g., 32 V), however, since the output current Iout is large, the inductor current IL when the power transistor 40 is on is also large. Thus, the voltage Va across the auxiliary coil L3 is also large, and the voltage Vcc drops less regardless of the power consumption of the control IC 42b. Note that the voltage Vcs when the power transistor 40 is off is zero volt because the charge charged in the capacitor 43 is discharged through the resistors 41 and 44.

At time t23 at which the voltage Vcs when the power transistor 40 is on becomes equal to the dropped voltage Vfb, the power transistor 40 is turned off as at time t21. In this case, the voltage Vcc is charged with the voltage Va from the auxiliary coil L3. However, since the output power Pout already drops and the output voltage Vout also drops, the inductor current IL when the power transistor 40 is on decreases. Thus, the voltage Va across the auxiliary coil L3 also drops, and the voltage Vcc is gradually drops with the power consumption of the control IC 42b.

Upon the voltage Vcc gradually dropping below the reference voltage VREF8 at time t24, the OPP 60c outputs the high signal opp_o. At this time, the oscillator circuit 80 outputs the oscillation signal Vosc with the frequency Fsw0. Then, the OCP 82 switches the reference voltage ocp_ref from the reference voltage VREF2 to the reference voltage VREF3. Note that the control IC 42b operates in the "normal mode" before time t24 and operates in the "OPP mode" at and after time t24.

===Transition from "OPP Mode" to "Normal Mode"===

Figure 17:
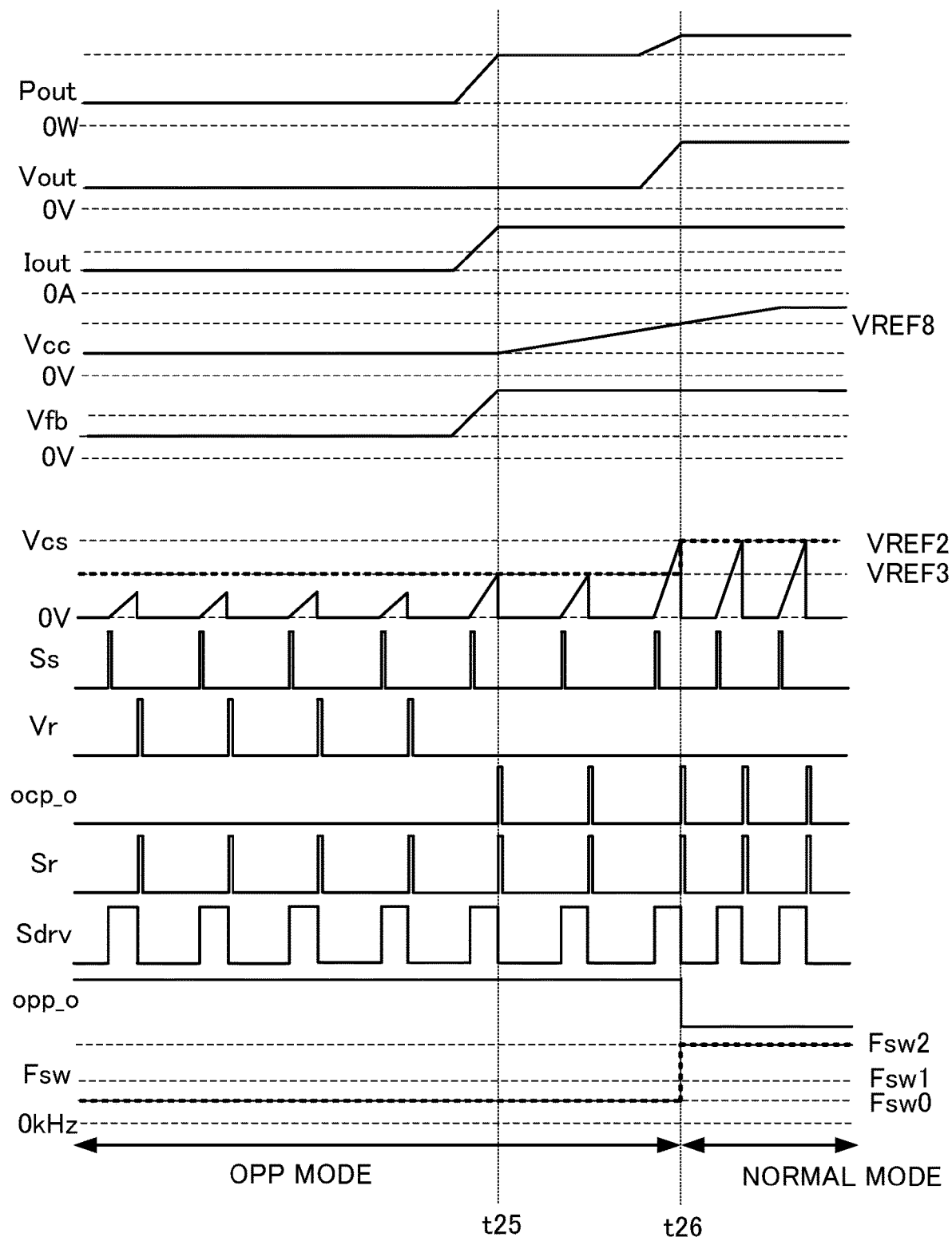
FIG. 17 is a diagram illustrating an example of an operation of a control IC 42b during a transition from an "OPP mode" to a "normal mode".

FIG. 17 is a diagram illustrating an example of an operation of the control IC 42b when transitioning from the "OPP mode" to the "normal mode". It is assumed that the control IC 42b operates in the "OPP mode" before time t25, and that the control IC 42b still operates in the "OPP mode" at and after time t25 until time t26. It is also assumed that the voltage Vfb does not drop below the reference voltage VREF1. In addition, it is assumed that the OR circuit 94 does not output the high signal Soff. As in FIG. 10, for explanatory convenience, the cycle of the signal Sdrv is different from the cycle in the actual operation.

Times t25 and t26 in FIG. 17 are illustrated so as to correspond to times t15 and t16 in FIG. 11. In addition, the rise in the voltage Vcc is illustrated so as to be gradual, which is different from the actual rise in the voltage Vcc. Operations that are different between FIG. 17 and FIG. 11 will be described below.

At time t25, the power transistor 40 is turned off because a state is interpreted as the inductor current IL flowing through the power transistor 40 being overcurrent. Accordingly, with the inductor current IL that is overcurrent flowing, the voltage Va across the auxiliary coil L3 increases, and the voltage Vcc starts gradually rising regardless of the power consumption of the control IC 42b. Note that the voltage Vcs when the power transistor 40 is off is zero volt because the charge charged in the capacitor 43 is discharged through the resistors 41 and 44.

Upon the voltage Vcc gradually rising to exceed the reference voltage VREF8 at time t26, the OPP 60c outputs the low opp_o. Accordingly, when the voltage Vfb is higher than the voltage Vfbd, the oscillator circuit 80 outputs the oscillation signal Vosc with the frequency Fsw2. Upon the OPP 60c outputting the low signal opp_o, the OCP 82 switches the reference voltage ocp_ref to the reference voltage VREF2.

===Summary===

The AC-DC converter 10a according to an embodiment of the present disclosure has been described above. The control IC 42a includes the OPP 60a and the control circuit 62a. The OPP 60a detects whether the voltage Vcs when the power transistor 40 is off is lower than the reference voltage VREF0. This enables the control IC 42a to detect a change in the output voltage Vout of the AC-DC converter 10a not based on the power supply voltage Vcc but based on the voltage Vcs. Accordingly, it is possible to provide an integrated circuit capable of detecting a change in the level of the output voltage more easily.

Further, the OPP 60a includes the comparator 70 and the timer 73. The timer 73 outputs the signal opp_o based on whether the voltage Vcs is lower than the reference voltage VREF0 for a predetermined period of time. This enables the OPP 60a to prevent false detection of a drop in the voltage Vcs when the power transistor 40 is off, upon activation of the AC-DC converter 10.

Further, the control circuit 62a includes the OCP 82 and the drive circuit 81. When the voltage Vcs when the power transistor 40 is off is lower than the reference voltage VREF0 for a predetermined period of time, the OPP 60a outputs the high signal opp_o and switches the reference voltage ocp_ref of the OCP 82 so as to decrease the overcurrent value. This makes it possible to limit power that is to be supplied to the secondary side of the transformer 22 in the "OPP mode".

Further, when the voltage Vcs when the power transistor 40 is off is higher than the reference voltage VREF0, the OPP 60a outputs the low signal opp_o and switches the reference voltage ocp_ref of the OCP 82 so as to increase the overcurrent value. This makes it possible to supply power appropriately to the secondary side of the transformer 22 in the "normal mode".

Further, the control circuit 62a includes the oscillator circuit 80. The oscillator circuit 80 outputs the oscillation signal Vosc with the frequency Fsw0 upon receiving the high signal opp_o, and the oscillator circuit 80 outputs the oscillation signal Vosc with the frequencies Fsw0 to Fsw2 upon receiving the low signal opp_o. This makes it possible to prevent supply of excessive power to the secondary side of the transformer 22 in the "OPP mode".

Further, upon receiving the low signal opp_o, the oscillator circuit 80 outputs the oscillation signal Vosc with the frequency Fsw that rises from the frequency Fsw0 to the frequency Fsw2 in stages as the voltage Vfb rises. This enables the oscillator circuit 80 to output the oscillation signal Vosc with the frequency Fsw1 even when the voltage Vfb changes within a predetermined range. In addition, the oscillator circuit 80 can output the oscillation signal Vosc with the frequency Fsw2 only when it is needed to supply large power to the motor 30.

Further, the control circuit 62a further includes the OVP 83. The OVP 83 outputs the high signal ovp_o when the power supply voltage Vcc is higher than the first predetermined voltage for a predetermined period of time. Upon the OVP 83 outputting the high signal ovp_o, the buffer 93 turns off the power transistor 40.

Further, the diode 50 that rectifies the voltage Va and the capacitor 49 are coupled to the terminal VCC, and the diode 45 that rectifies the voltage Va and the capacitor 43 are coupled to the terminal CS. This makes it possible to detect a change in the output voltage Vout based on the voltage Vcs, as in the case of detecting a change in the output voltage Vout based on the power supply voltage Vcc. In addition, detection of a change in the output voltage Vout based on the voltage Vcs enables more various power supply circuits to detect a change in the output voltage Vout, than in the case of detection of a change in the output voltage Vout based on the power supply voltage Vcc.

Further, the control circuit 62a further includes the discharge circuit 88. The discharge circuit 88 discharges the capacitor 43 at the rising edge of the signal Sdrv. This enables the control IC 42a to detect both the voltage Vb when the power transistor 40 is on and the voltage Va when the power transistor 40 is off, based on the voltage Vcs.

Further, the control IC 42b includes the OPP 60c and the control circuit 62b. The OPP 60c detects whether the power supply voltage Vcc at the terminal VCC is lower than the reference voltage VREF8. This enables the control IC 42b to detect a change in the target level of the output voltage Vout of the AC-DC converter 10b based on the power supply voltage Vcc at the terminal VCC. Accordingly, it is possible to provide an integrated circuit capable of detecting a change in the level of an output voltage more easily.

According to the present disclosure, it is possible to provide an integrated circuit capable of appropriately detecting a voltage from an auxiliary coil.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that generates an output voltage at a target level from an input voltage inputted thereto, the power supply circuit including
   a transformer including a primary coil, a secondary coil, and an auxiliary coil, and
   a transistor configured to control a current flowing through the primary coil,
the integrated circuit being configured to drive the transistor, the integrated circuit comprising:
   a first terminal configured to receive a voltage corresponding to a coil voltage across the auxiliary coil when the transistor is off;
   a second terminal configured to receive a feedback voltage corresponding to the output voltage;
   a third terminal configured to receive a voltage, which
      corresponds to a current flowing through the transistor when the transistor is on, and
      corresponds to the coil voltage when the transistor is off;
   a first detection circuit configured to detect whether the voltage at the third terminal when the transistor is off is lower than a first reference voltage; and
   a control circuit configured to control switching of the transistor based on the feedback voltage, the voltage at the third terminal when the transistor is on, and a result of detection of the first detection circuit.

2. The integrated circuit according to claim 1, wherein the first detection circuit includes
   a comparison circuit configured to compare the voltage at the third terminal to the first reference voltage, and
   an output circuit configured to output the result of detection, based on whether the voltage at the third terminal is lower than the first reference voltage for a predetermined period of time when the transistor is off.

3. The integrated circuit according to claim 1, wherein the control circuit includes
a second detection circuit configured to detect whether the current flowing through the transistor is larger than a predetermined current that is adjusted based on the result of detection, and
a drive circuit configured to turn on the transistor based on an oscillation signal, and turn off the transistor based on the voltage at the third terminal when the transistor is on and the feedback voltage,
the first detection circuit is further configured to decrease the predetermined current, upon detecting that the voltage at the third terminal when the transistor is off is lower than the first reference voltage, and
the drive circuit is further configured to turn off the transistor, upon detecting the current flowing through the transistor reaching the predetermined current.

4. The integrated circuit according to claim 3, wherein the first detection circuit is further configured to increase the predetermined current, upon detecting that the voltage at the third terminal when the transistor is off is higher than the first reference voltage.

5. The integrated circuit according to claim 4, wherein the first detection circuit is further configured to
output a first signal as the result of detection, upon detecting that the voltage at the third terminal when the transistor is off is lower than the first reference voltage, and
output a second signal as the result of detection, upon detecting that the voltage at the third terminal when the transistor is off is higher than the first reference voltage, and
the control circuit further includes an oscillator circuit configured to
output the oscillation signal with a first frequency, when receiving the first signal, and
output the oscillation signal with a frequency that is equal to or higher than the first frequency and that corresponds to the feedback voltage, when receiving the second signal.

6. The integrated circuit according to claim 5, wherein the oscillator circuit is further configured to, when receiving the second signal, raise the frequency of the oscillation signal in stages from the first frequency through a second frequency to a third frequency, based on the feedback voltage that changes with a drop in the output voltage.

7. The integrated circuit according to claim 3, wherein the control circuit further includes a third detection circuit configured to detect whether the voltage at the first terminal is higher than a second reference voltage, and
the drive circuit is further configured to turn off the transistor, when the voltage at the first terminal is higher than the second reference voltage.

8. The integrated circuit according to claim 1, wherein the power supply circuit further includes
a first diode configured to rectify the coil voltage,
a first capacitor configured to be charged with a current flowing through the first diode,
a detection resistor configured to detect the current flowing through the transistor when the transistor is on,
a second diode configured to rectify the coil voltage, and
a second capacitor configured to be charged with a current flowing through the second diode;

the first diode and the first capacitor are coupled to the first terminal; and
the detection resistor, the second diode, and the second capacitor are coupled to the third terminal.

9. The integrated circuit according to claim 8, wherein the control circuit includes a discharge circuit configured to, upon turning on of the transistor, discharge the second capacitor for a second period of time shorter than a first period of time during which the transistor is on.

10. A power supply circuit configured to generate an output voltage at a target level from an input voltage inputted thereto, the power supply circuit comprising:
a transformer including a primary coil, a secondary coil, and an auxiliary coil;
a transistor configured to control a current flowing through the primary coil;
an integrated circuit including first to third terminals, the integrated circuit being configured to drive the transistor;
a first diode configured to rectify a coil voltage across the auxiliary coil;
a first capacitor coupled to the first terminal, and configured to be charged with a current flowing through the first diode;
a detection resistor coupled to the third terminal, and configured to detect a current flowing through the transistor when the transistor is on;
a second diode configured to rectify the coil voltage; and
a second capacitor coupled to the third terminal, and configured to be charged with a current flowing through the second diode, wherein
the integrated circuit includes
a first detection circuit configured to detect whether a voltage at the third terminal when the transistor is off is lower than a first reference voltage, and
a control circuit configured to control switching of the transistor, based on the voltage at the third terminal when the transistor is on, a result of detection of the first detection circuit, and a feedback voltage that is received by the second terminal and that corresponds to the output voltage.

11. An integrated circuit for a power supply circuit that generates an output voltage at a target level from an input voltage inputted thereto, the power supply circuit including
a transformer including a primary coil, a secondary coil, and an auxiliary coil, and
a transistor configured to control a current flowing through the primary coil,
the integrated circuit being configured to drive the transistor, the integrated circuit comprising:
a first terminal configured to receive a first voltage corresponding to a coil voltage across the auxiliary coil when the transistor is off;
a second terminal configured to receive a second voltage that is a feedback voltage corresponding to the output voltage;
a third terminal configured to receive a third voltage corresponding to a current flowing through the transistor when the transistor is on;
a detection circuit configured to detect whether the first voltage at the first terminal when the transistor is off is lower than a reference voltage; and
a control circuit configured to control switching of the transistor, based on the third voltage at the third terminal when the transistor is on, a result of detection of the detection circuit, and the feedback voltage, wherein the control circuit incudes an overcurrent detection circuit that is coupled to the third terminal, the overcurrent detection circuit being configured to determine whether the current flowing through the transistor is overcurrent, and the overcurrent detection circuit has a determination threshold for determining the overcurrent, the determination threshold being switched according to the result of detection using the reference voltage of the detection circuit.

12. A power supply circuit configured to generate an output voltage at a target level from an input voltage inputted thereto, the power supply circuit comprising:
   a transformer including a primary coil, a secondary coil, and an auxiliary coil;
   a transistor configured to control a current flowing through the primary coil;
   an integrated circuit including first to third terminals, the integrated circuit being configured to drive the transistor;
   a first diode configured to rectify a coil voltage across the auxiliary coil;
   a first capacitor coupled to the first terminal, and configured to be charged with a current flowing through the first diode; and
   a detection resistor coupled to the third terminal, and configured to detect a current flowing through the transistor when the transistor is on, wherein
the integrated circuit includes
   a detection circuit configured to detect whether a voltage at the first terminal when the transistor is off is lower than a reference voltage, and
   a control circuit configured to control switching of the transistor, based on a voltage at the third terminal when the transistor is on, a result of detection of the detection circuit, and a feedback voltage that is received by the second terminal and that corresponds to the output voltage, wherein
the control circuit includes an overcurrent detection circuit that is coupled to the third terminal, the overcurrent detection circuit being configured to determine whether the current flowing through the transistor is overcurrent, and
the overcurrent detection circuit has a determination threshold for determining the overcurrent, the determination threshold being switched according to the result of detection using the reference voltage of the detection circuit.

* * * * *